United States Patent
Joye et al.

(10) Patent No.: US 10,707,698 B2
(45) Date of Patent: Jul. 7, 2020

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Klaas Jacob Lulofs, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 223 days.

(21) Appl. No.: 15/778,371

(22) PCT Filed: Nov. 7, 2016

(86) PCT No.: PCT/EP2016/076762
§ 371 (c)(1),
(2) Date: May 23, 2018

(87) PCT Pub. No.: WO2017/089096
PCT Pub. Date: Jun. 1, 2017

(65) Prior Publication Data
US 2018/0342899 A1    Nov. 29, 2018

(30) Foreign Application Priority Data
Nov. 25, 2015 (EP) .................................. 15196289

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .................................. H02J 50/12; H02J 50/80
(Continued)

(56) References Cited

U.S. PATENT DOCUMENTS 7,208,912 B2    4/2007    Ghabra et al.
9,125,242 B2    9/2015    Budgett
(Continued)

FOREIGN PATENT DOCUMENTS

DE      19546928 A1    6/1997
WO    2013024396 A1    2/2013

OTHER PUBLICATIONS

Wireless Power Consortium, www.wirelesspowerconsortium.com/index.html, accessed May 2018.
(Continued)

*Primary Examiner* — Rexford N Barnie
*Assistant Examiner* — Thai H Tran

(57) ABSTRACT

A power transmitter (101) for inductively transferring power to a power receiver (105) comprises a resonance circuit (201) comprising a transmitter coil (103) for generating a power transfer signal. A sampler (511) samples a current through, or voltage over, the transmitter coil (103). A message receiver (509) receives messages load modulated onto the power transfer signal based on the samples. A driver (203) generates a drive signal for the resonance circuit (201) and a resonance modification circuit (505) reduces the resonance frequency of the resonance circuit (201) by slowing a state change for a resonating component of the resonance circuit (201) for a fractional time interval of the cycles of the drive signal. A sample time controller (513) controls the sample times in response to at least one of start-times and end-times of the fractional time intervals, and specifically may set the sample times to be within the fractional time intervals.

15 Claims, 19 Drawing Sheets

(58) Field of Classification Search
USPC .......................................... 307/104; 320/108
See application file for complete search history.

(56) References Cited

U.S. PATENT DOCUMENTS

| | | |
|---|---|---|
| 2003/0006880 A1 | 1/2003 | Zimmer |
| 2003/0231039 A1 | 12/2003 | Locke |
| 2004/0130915 A1 | 7/2004 | Baarman |
| 2006/0113970 A1 | 6/2006 | Stover et al. |
| 2012/0032632 A1* | 2/2012 | Soar ........................ H01F 38/14 320/108 |
| 2013/0062961 A1 | 3/2013 | Park et al. |
| 2014/0028110 A1 | 1/2014 | Petersen et al. |
| 2014/0045425 A1* | 2/2014 | Roh ................... G06K 19/0726 455/41.1 |

OTHER PUBLICATIONS

"System Description Wireless Power Transfer", vol. 1: Low Power, Part 1: Interface Definition, Jul. 2010.

* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2016/076762, filed on 7 Nov. 2016, which claims the benefit of European Patent Application No. 15196289.1, filed on 25 Nov. 2015. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer systems.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor and a secondary receiver coil. By separating the primary transmitter inductor and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter inductor in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Many wireless power transmission systems, such as e.g. Qi, supports communication from the power receiver to the power transmitter thereby enabling the power receiver to provide information to the power transmitter that may allow this to adapt to the specific power receiver or the specific conditions experienced by the power receiver.

In many systems, such communication is by load modulation of the power transfer signal. Specifically, the communication is achieved by the power receiver performing load modulation wherein a load applied to the secondary receiver coil by the power receiver is varied to provide a modulation of the power signal. The resulting changes in the electrical characteristics (e.g. variations in the current of the transmitter inductor) can be detected and decoded (demodulated) by the power transmitter.

Thus, at the physical layer, the communication channel from power receiver to the power transmitter uses the power signal as a data carrier. The power receiver modulates a load which can be detected by a change in the amplitude and/or phase of the transmitter inductor current or voltage.

More information of the application of load modulation in Qi can e.g. be found in chapter 6 of part 1 of the Qi wireless power specification (version 1.0).

Wireless power transmitters constructed according to the Qi v1.1 specification operate in the so-called inductive regime. In this mode, power transfer occurs at tight coupling (coupling factor typically above 0.3) with relatively high efficiency. If a larger distance ("Z-distance") or more positioning freedom of the receiver is desired, power transfer typically occurs in the so-called resonant regime with loose coupling (coupling factor typically below 0.3). In the resonant regime, the resonance frequencies of power transfer resonance circuits at the power transmitter and at the power receiver should match to achieve the maximum efficiency. However, with an increased distance between the resonance circuits, the load modulation communication from power receiver to power transmitter becomes increasingly difficult. In resonant mode, the power transmitter's resonant circuit typically becomes underdamped which makes it sensitive to intermodulation distortion (with the intermodulation being between the resonance frequency of the power transmitter and the drive frequency). Indeed, if the resonance frequency and the drive frequency of the power transmitter do not match, intermodulation frequencies appear, resulting in a degradation in communication performance, and often making the demodulation process at the power transmitter problematic or even impossible.

In order to address the intermodulation problems, it has been proposed to employ a tunable resonance circuit at the power transmitter, i.e. it has been proposed to use a resonance circuit for which the resonance frequency can be dynamically varied. In such a system, the drive frequency and the resonance frequency of the power transmitter may both be adapted to be the same as the resonance frequency of the power receiver. This may ensure that the system efficiently operates in the resonance mode while at the same time preventing (or at least mitigating) intermodulation effects between the drive frequency and the power transmitter resonance circuit. It may further in many scenarios allow the system to adapt and compensate for variations and tolerances of component values etc. An example of a system setting the frequencies of the drive signal, the transmitter resonance frequency and the receiver resonance frequency to the same value is provided in US20040130915A1.

A particular approach for adapting the resonance frequency of a power transmitter is described in WO2013024396. In the example, the power transmitter may dynamically control a switch to add an inductive or capacitive value to a resonance circuit during part of a resonating cycle. This may reduce the effective resonance frequency of the resonance circuit and may be used to match the resonance frequency to e.g. the drive signal being fed to the resonance circuit.

However, although such approaches may improve the communication by load modulation, the performance of the communication depends on a number of factors. In particular, it has been found that the communication performance is heavily dependent on the timing of samples used to demodulate the modulation of the power transfer signal, and that specifically the modulation depth depends on the timing of the sampling. Suboptimal timing of the sampling may thus often result in the modulation performance being degraded. In some systems, modulation may be based on peak detection of e.g. the current through the power coil of the power transmitter. However, such an approach tends to require additional, and often relatively complex, circuitry. Further, such peak detection circuitry tends to be relatively inaccurate and thus the detected values often do not accurately reflect the underlying signal. This may also result in degraded communication performance.

Hence, an improved power transfer approach would be advantageous. In particular, an approach that allows improved operation, improved power transfer, increased flexibility, facilitated implementation, facilitated operation, improved communication, reduced communication errors, improved power transfer, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power transmitter for inductively transferring power to a power receiver, the power transmitter comprising: a resonance circuit comprising a capacitive impedance and an inductive impedance, the inductive impedance comprising a transmitter coil for generating a power transfer signal for wirelessly transferring power to the power receiver; a sampler for generating samples by sampling at sample times at least one of a current through the transmitter coil and a voltage over the transmitter coil; a message receiver for receiving messages load modulated onto the power transfer signal by the power receiver, the message receiver being arranged to detect the modulation in response to the samples; a driver for generating a drive signal for the resonance circuit; a resonance modification circuit for reducing the resonance frequency of the resonance circuit by slowing a state change for at least one of the capacitive impedance and the inductive impedance in a fractional time interval of each of at least a plurality of cycles of the drive signal, the state change being a change of at least one of a voltage of the capacitive impedance and a current of the inductive impedance and the resonance modification circuit being arranged to begin slowing the state change at a start-time of the fractional time interval and to stop slowing the state change at an end-time of the fractional time interval; and a sample time controller for controlling the sample times in response to at least one of start-times and end-times of the fractional time intervals.

The invention may provide improved performance in many wireless power transfer systems and may in particular provide improved communication by load modulation. In many embodiments, improved power transfer, and especially improved power transfer efficiency, can be achieved while still providing reliable communication based on load modulation of the power signal. In many applications, reduced complexity can be achieved. In particular, in some embodiments the use of peak detection circuitry can be avoided.

The invention may in particular provide improved load modulation based communication in many systems wherein a power transmitter resonance frequency is modified to be aligned to a drive frequency by the slowing of a state change of a resonating component.

The fractional time intervals may typically be periodically repeating time intervals and the start-times and end-times may typically be periodically repeating start-times and end-times.

The reduction of the resonance frequency of the resonance circuit may be to approach the drive frequency of the drive signal.

In some embodiments, the resonance modification circuit may be arranged to align the resonance frequency of the resonance circuit with the drive frequency by the slowing of the state change. The approach of aligning the resonance frequency by slowing a state change may facilitate and/or improve the alignment/linking of the operating frequency (the drive frequency of the drive signal) and the (effective) resonance frequency of the transmitter power transfer resonance circuit. The approach may provide improved power efficiency.

In many embodiments, the alignment may be such that the drive frequency and the resonance frequency are intrinsically linked together, and specifically they may be linked such that they are (e.g. continuously) the same. The alignment to the drive signal may specifically obviate or reduce the need for measurements of signals such as currents or voltages of the resonance circuit.

The alignment of the drive frequency and the resonance frequency may specifically adapt the resonance frequency to be the same as the drive frequency.

The sample times (or sample instants) may correspond to a timing of a substantially instantaneous sampling or may e.g. refer to a start and/or end time of a sampling having an extended duration.

The slowing of the state change may be a slowing relative to a resonance circuit including only the capacitive impedance and the inductive impedance. The capacitive impedance and the inductive impedance may typically be coupled in a series or parallel resonance configuration. The resonance frequency of a freely running resonance circuit formed by the capacitive and inductive impedance is referred to as the natural frequency of the resonance circuit. The resonance frequency resulting from the slowing of the state change will be referred to as the effective resonance frequency of the resonance circuit.

The state may specifically be an energy state, and specifically may be a voltage across the capacitive impedance and/or a current through the inductive impedance.

The slowing of the state change may be by impeding or reducing energy flow between the capacitive impedance and the inductive impedance (such that only part of the energy flowing out of one reaches the other). Slowing may be by directing at least some energy away from the receiving impedance.

Thus, the resonance modification circuit may begin to reduce (e.g. divert away or limit/block) energy flowing between the capacitive impedance and the inductive impedance at the start-time of the fractional time interval in a cycle and may stop reducing (e.g. diverting away or limiting/blocking) energy flowing between the capacitive impedance and the inductive impedance at the end time of the fractional time interval in the cycle. In many embodiments, the slowing, e.g. by diverting away energy, may only be performed during the fractional time interval (and e.g. not at any other time during a cycle). In many embodiments, a cycle may include one or more fractional time intervals in which the state change is slowed and one or more fractional time intervals in which the state change is not slowed.

The resonance modification circuit may be arranged to reduce the resonance frequency of the resonance circuit by slowing a state change for at least one of the capacitive impedance and the inductive impedance in the fractional time interval of each of at least a plurality of cycles of the drive signal but not in surrounding time intervals, the surrounding time intervals being a time interval immediately preceding the fractional time interval and a time interval immediately following the fractional time interval.

The fractional time interval in which slowing is performed may be referred to as the first fractional time interval.

The slowing may be by a circuit which is arranged to reduce energy flow during the first fractional time interval but not during the surrounding time intervals.

The resonance modification circuit may be directed to the energy flowing from a first impedance away from a second impedance during the first fractional time interval but not during the surrounding time intervals, the first impedance being a first of the capacitive impedance and the inductive impedance and the second impedance being a second of the capacitive impedance and the inductive impedance. Thus, the resonance modification circuit may be arranged to reduce the resonance frequency of the resonance circuit by slowing a state change by comprising a circuit arranged to divert away or limit/block energy flowing from a first impedance to the second impedance during the first fractional time interval but not during the surrounding time intervals, the first impedance being a first of the capacitive impedance and the inductive impedance and the second impedance being a second of the capacitive impedance and the inductive impedance.

In many embodiments the resonance modification circuit may be arranged to divert away or limit/block a current flowing from a first impedance to a second impedance during the first fractional time interval but not during the surrounding time intervals, the first impedance being a first of the capacitive impedance and the inductive impedance and the second impedance being a second of the capacitive impedance and the inductive impedance. Thus, the resonance modification circuit may be arranged to reduce the resonance frequency of the resonance circuit by slowing a state change by comprising a circuit arranged to divert away or limit/block current flowing from a first impedance away from a second impedance during the first fractional time interval but not during the surrounding time intervals, the first impedance being a first of the capacitive impedance and the inductive impedance and the second impedance being a second of the capacitive impedance and the inductive impedance.

In some embodiments, the cycle may be divided into the first fractional time interval and at least one of the surrounding time intervals. One of the surrounding time intervals for a first fractional time interval may be considered to be part of a preceding or following cycle.

The fractional time interval has a duration which is less than a time period of the drive signal, and typically a duration which is less than half a time period of the drive signal. Thus, each cycle comprising a fractional time interval in which the slowing of the state change is applied comprises also at least one time interval in which the slowing of the state change is not applied.

The start-time and end-times may typically be time instants relative to a time instant/event of each cycle (in which a fractional time interval is present). For example, the start-time and end-time may be considered relative to a zero crossing of the drive signal. The fractional time interval may specifically be a time interval occurring in a plurality of (but not necessarily all or consecutive) cycles of the drive signal and having a duration of less than a cycle/time period of a cycle of the drive signal.

In many embodiments, a cycle may include a plurality of fractional time interval in which the state change is slowed. Consecutive fractional time intervals (whether in the same cycle or in different cycles) may be divided by intervals in which the state change is not slowed.

The capacitive impedance may typically be a capacitor and the inductive impedance may typically be an inductor. However, in some embodiments, the capacitive impedance and/or the inductive impedance may e.g. also include a resistive component.

The resonance frequency may typically be reduced the longer the duration of the fractional time interval. The frequency modification circuit may reduce a natural resonance frequency of the capacitive impedance and the inductive impedance (corresponding to a frequency at which they would oscillate in a resonance circuit consisting of only the capacitive impedance and the inductive impedance). The effective resonance frequency may in many embodiments be changed by the power transmitter increasing the duration of the fractional time interval, e.g. by changing the start-time and/or end-time for the fractional time interval.

In some embodiments, the power transmitter may be arranged to reduce the resonance frequency by increasing the duration of the fractional time interval. The power receiver may provide power to an external load, such as for charging a battery or powering a device.

In some embodiments, the frequency modification circuit is arranged to slow the state change by impeding an energy flow between the inductive impedance and the capacitive impedance during the fractional time interval.

This may provide improved performance in many scenarios, and may in particular provide an effective adjustment of the resonance frequency. The approach may facilitate implementation. The energy flow may be impeded while being from the capacitive impedance to the inductive impedance, from the inductive impedance to the capacitive impedance, or both when it is from the inductive impedance to the capacitive impedance and when it is from the capacitive impedance to the inductive impedance.

Impeding energy flow may include both reducing energy flow and completely preventing any energy flow.

In many embodiments, the frequency modification circuit is arranged to slow the state change by impeding current flow between the inductive resonance and the capacitive impedance during the fractional time interval.

This may provide a particularly effective control and may provide a practical implementation. The current flow may be a positive or negative current flow. Impeding current flow may include both reducing current flow and completely preventing any current flow.

In some embodiments, the frequency modification circuit is arranged to slow the state change for the inductive impedance by impeding current flow from the capacitive impedance to the inductive impedance during the fractional time interval.

This may provide a particularly effective performance while allowing facilitated and typically low complexity implementation.

In some embodiments, the frequency modification circuit is arranged to slow the state change for the inductive impedance by blocking current flow from the capacitive impedance to the inductive impedance during the fractional time interval.

This may provide a particularly effective performance while allowing facilitated and typically low complexity implementation.

In each of the at least a plurality of cycles of the drive signal, the timing of the end and/or start-time may be time aligned and time synchronized to a zero crossing or extreme of the generated drive signal.

In many embodiments, at least one of the start and end-time of the fractional time interval has a fixed time offset to a time instant of the plurality of cycles of the drive signal. The time instant may be the time of an event, such as a zero crossing or transition. The fixed offsets are applied in each of the at least a plurality of cycles of the drive signal.

The sample time controller may for example determine start-times and/or end-times for a current fractional time interval based on start-times and/or end-times of a previous fractional time interval. The start-time and/or end-time may be estimated times. In particular, for a given fractional time interval the end-time may be determined from the end-time of the previous fractional time interval and a measured, estimated and/or calculated repetition interval for substantially periodic fractional time intervals.

In accordance with an optional feature of the invention, the sample time controller is arranged to control the sample times to be within the fractional time intervals.

This may provide particularly advantageous implementation, operation and/or performance in many embodiments and scenarios. It may allow a sampling of the coil current/voltage at a time where changes are reduced or even where the signals are constant. For example, in some systems where the slowing of the state change corresponds to substantially preventing any state change, sampling may be performed when the signal is constant, and often at a constant peak value. Thus may facilitate sampling, reduce the need for additional circuitry and/or e.g. reduce sensitivity to jitter thereby resulting in improved demodulation.

In some embodiments, the sample time controller may be arranged to control the sample times to be within an interval from 2 micro seconds before the start time of a fractional time interval to 2 microseconds after the end time of the fractional time interval.

In some embodiments, the sample time controller may be arranged to control the sample times to be within an interval from 10% of a cycle time of the drive signal before the start time of a fractional time interval to 10% of the cycle time after the end time of the fractional time interval.

Such sampling may provide particularly efficient operation.

In accordance with an optional feature of the invention, the sample time controller is arranged to control the sample times in response to end-times of the fractional time intervals.

This may provide particularly advantageous implementation, operation and/or performance in many embodiments and scenarios. It may for example provide a more consistent performance for different drive frequencies/effective resonance frequencies in many applications.

In some embodiments, the sample time controller may be arranged to control the sample times in response to only end-times of the fractional time intervals.

In accordance with an optional feature of the invention, the sample time controller is arranged to control the sample times in response to start-times of the fractional time intervals.

This may provide particularly advantageous implementation, operation and/or performance in many embodiments and scenarios. It may for example provide facilitated determination of sample times due to the sample time for a given fractional time interval being after the start of that fractional time interval, and thus a causal dependency can be used within the individual fractional time interval.

In some embodiments, the sample time controller may be arranged to control the sample times in response to only start-times of the fractional time intervals.

In accordance with an optional feature of the invention, the sample time controller is arranged to control the sample times to occur in a time interval from one half cycle time of the drive signal before the end-times to the end-times.

This may provide particularly advantageous implementation, operation and/or performance in many embodiments and scenarios. In many embodiments, it may provide a suitable margin for e.g. jitter and switch noise.

In accordance with an optional feature of the invention, the sample time controller is arranged to determine the sample times to precede the end-times by a time offset.

This may provide an efficient yet low complexity determination of advantageous sampling times in many embodiments. The time offset may be fixed for a plurality of cycles and may specifically be a predetermined value. The time offset may for example be in the interval from e.g. 2% of a cycle time to 30% of a cycle time for the natural resonance frequency.

In accordance with an optional feature of the invention, the time offset is no less than 20 nanosecond and no more than 5 microsecond.

This may provide particularly advantageous implementation, operation and/or performance in many embodiments and scenarios. In many embodiments, it may provide a suitable margin for e.g. jitter and switch noise.

In some embodiments, the time offset is no less than 20 nanosecond and no more than 1 microsecond.

In accordance with an optional feature of the invention, the sample time controller is arranged to determine the sample times in response to both the start-times and end-times.

This may provide particularly efficient operation in many embodiments, and may in many scenarios provide an improved determination of the sample times relative to both the start and end-times. For example, the sample times may be determined as midway between the start and end-times. The approach may in many scenarios provide improved adaptation to variations in the duration of the fractional time intervals due to variations in the desired effective resonance frequency of the resonance circuit.

In accordance with an optional feature of the invention, start-times of the fractional time intervals are determined by zero crossings of at least one of the voltage over the inductor and a current of a capacitor of the capacitive impedance, and the sample time controller is arranged to detect the start-times in response to a detection of zero crossings of the at least one of the voltage over the inductor and the current of the capacitor.

This may provide particularly efficient operation and/or implementation in many embodiments. It may in particular in many embodiments allow for a closer correspondence between the effective resonance frequency and the drive frequency of the drive signal.

In accordance with an optional feature of the invention, the end-times of the fractional time intervals are aligned with switch transitions of at least one switch of a switch bridge of the driver, and the sample time controller is arranged to determine the end-times in response to a switch signal for the switch bridge.

This may provide particularly efficient operation and/or implementation in many embodiments. It may in particular in many embodiments allow for a closer correspondence between the effective resonance frequency and the drive frequency of the drive signal.

In accordance with an optional feature of the invention, the resonance modification circuit is arranged to substantially stop the state change during the fractional time intervals.

This may provide improved performance in many embodiments, and may in particular allow the sampling to be of a substantially constant value, such as specifically a peak value, during the fractional time interval.

In accordance with an optional feature of the invention, the resonance modification circuit is arranged to short-circuit a capacitor of the capacitive impedance during the fractional time intervals, and the message receiver is arranged to demodulate load modulated messages in response to samples of the inductor current during the fractional time intervals.

This may provide a particularly efficient implementation.

In accordance with an optional feature of the invention, the power transmitter further comprises: a timer for generating a timing signal having transitions corresponding to at least one of start-times and end-times of the fractional time intervals; and the sample time controller is arranged to control the sample times in response to the transitions of the timing signal.

This may provide a particularly efficient and low complexity implementation in many embodiments.

The timing signal may in addition to the transitions representing start-times and/or end times also comprise other transitions. Such other transitions may in many scenarios be ignored by the sample time controller (for example, the sample time controller may only consider positive edge transitions and ignore negative ones or vice versa). The transitions of the timing signal may be any change of the value or property of the timing signal which can be detected and for which the timing can be determined. In many embodiments, the timing signal may be arranged to transition between two values and the transitions may be transitions between these two values, or e.g. may only be transitions in one direction.

A transition may be a change in the signal of the timing signal, and specifically a change from one state to another (the states may be instantaneous, i.e. may be snapshots or instantaneous values of a (continuously) changing parameter). In many embodiments, a transition may be a change in a signal level of the timing signal, and specifically a change from one signal level to another signal level (the signal levels before and after the change may be instantaneous, i.e. may be snapshots or instantaneous values of a (continuously) changing signal level).

According to an aspect of the invention there is provided a wireless power transfer system comprising a power transmitter for inductively transferring power to a power receiver, the power transmitter comprising: a resonance circuit comprising a capacitive impedance and an inductive impedance, the inductive impedance comprising a transmitter coil for generating a power transfer signal for wirelessly transferring power to the power receiver; a sampler for generating samples by sampling at sample times at least one of a current through the transmitter coil and a voltage over the transmitter coil; a message receiver for receiving messages load modulated onto the power transfer signal by the power receiver, the message receiver being arranged to detect the modulation in response to the samples; a driver for generating a drive signal for the resonance circuit; a resonance modification circuit for reducing the resonance frequency of the resonance circuit by slowing a state change for at least one of the capacitive impedance and the inductive impedance in a fractional time interval of each of at least a plurality of cycles of the drive signal, the state change being a change of at least one of a voltage of the capacitive impedance and a current of the inductive impedance, the resonance modification circuit (505) being arranged to begin slowing the state change at a start-time of the fractional time interval and to stop slowing the state change at an end-time of the fractional time interval; and a sample time controller for controlling the sample times in response to at least one of start-times and end-times of the fractional time intervals.

According to an aspect of the invention there is provided a method of operation for a power transmitter inductively transferring power to a power receiver, the power transmitter comprising a resonance circuit comprising a capacitive impedance and an inductive impedance, the inductive impedance comprising a transmitter coil for generating a power transfer signal for wirelessly transferring power to the power receiver; wherein the method comprises: generating samples by sampling at sample times at least one of a current through the transmitter coil and a voltage over the transmitter coil; receiving messages load modulated onto the power transfer signal by the power receiver in response to the samples; generating a drive signal for the resonance circuit; reducing the resonance frequency of the resonance circuit by slowing a state change for at least one of the capacitive impedance and the inductive impedance in a fractional time interval of each of at least a plurality of cycles of the drive signal, the state change being a change of at least one of a voltage of the capacitive impedance and a current of the inductive impedance and the slowing of the state change is begun at a start-time of the fractional time interval and stopped at an end-time of the fractional time interval; and controlling the sample times in response to at least one of start-times and end-times of the fractional time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
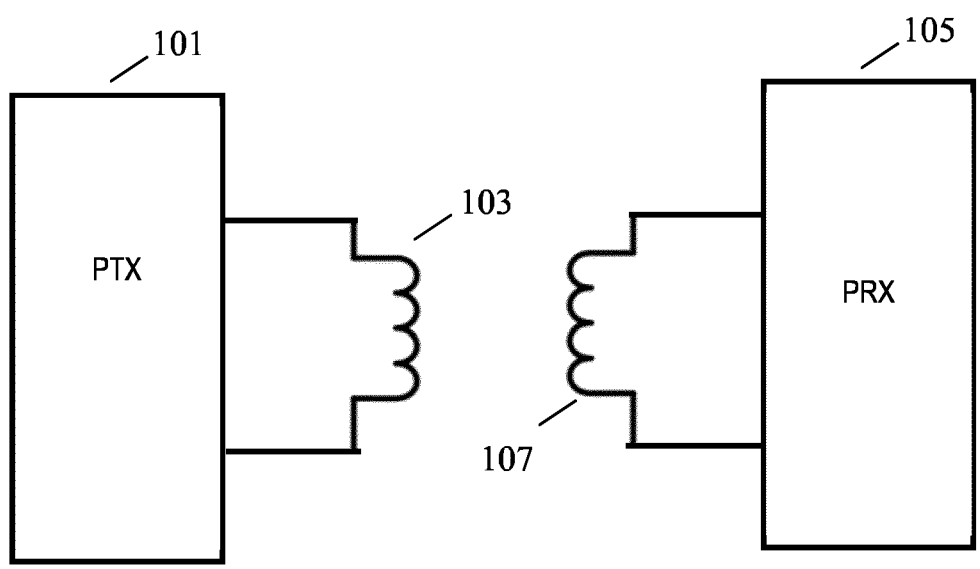
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter inductor/inductor 103. The system further comprises a power receiver 105 which includes (or is coupled to) a receiver coil/inductor 107.

The system provides a wireless inductive power transfer from the power transmitter 101 to the receiver 105. Specifically, the power transmitter 101 generates a wireless inductive power transfer signal (also referred to as a power transfer signal, power transfer signal or an inductive power transfer signal), which is propagated as a magnetic flux by the transmitter inductor 103. The power transfer signal may typically have a frequency between around 70 kHz to around 150 kHz, and often for Qi compatible systems typically in the range from 95 kHz to 115 kHz. The transmitter inductor 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter inductor 103 to the receiver coil 107. The term power transfer signal is mainly used to refer to the inductive signal/magnetic field between the transmitter inductor 103 and the receiver coil 107 (the magnetic flux signal), but it will be appreciated that by equivalence it may also be considered and used as a reference to an electrical signal provided to the transmitter inductor 103 or picked up by the receiver coil 107.

The system is arranged to transfer substantial power levels, and specifically the power transmitter may support power levels in excess of 500 mW, 1 W, 5 W, or 50 W in many embodiments. For example, for Qi corresponding applications, the power transfers may typically be in the 1-5 W power range for low power applications, and in excess of 100 W and up to more than 1000 W for high power applications, such as e.g. kitchen applications.

Figure 2:
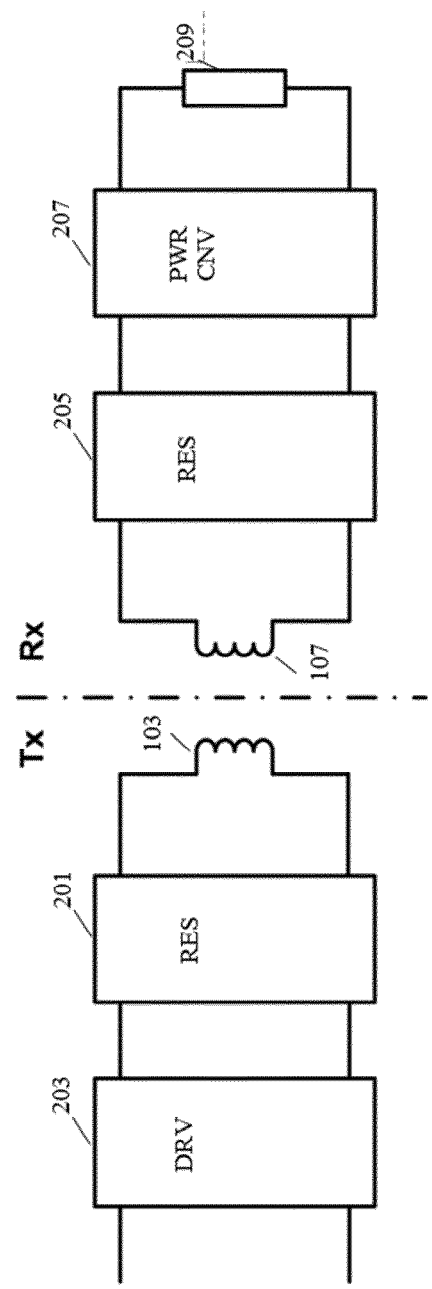
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance tank or resonance circuit 201, which includes the transmitter inductor 103 (in FIG. 2, the transmitter inductor 103 is for clarity shown external to the resonance circuit 201 but is considered to be part of this). The resonance circuit 201 of the power transmitter 101 will also be referred to as the transmitter resonance circuit 201. The resonance circuit 201 may typically be a serial or parallel resonance circuit, and may in particular consist of a resonance capacitor coupled in parallel (or in series) to the transmitter inductor 103. The power transfer signal is generated by driving the output resonance circuit from a driver 203 generating a drive signal with a suitable drive frequency (typically in the 20-200 kHz frequency range).

Similarly, the input circuit of the power receiver 105 includes a resonance circuit or resonance tank 205 which includes the receiver inductor 107 (in FIG. 2, the receiver inductor 107 is for clarity shown external to the resonance circuit 205 but is considered to be part of this). The resonance circuit 205 of the power receiver 105 will also be referred to as the receiver resonance circuit 205 or the receiver resonance circuit. The receiver resonance circuit 205 may typically be a serial or parallel resonance circuit, and may in particular consist of a resonance capacitor coupled in parallel (or series) to the receiver inductor 107. The receiver resonance circuit 205 is coupled to a power converter 207 which converts the received power transfer signal, i.e. the induced signal provided by the receiver resonance circuit 205, into a power that is provided to an external load 209 (typically by performing AC/DC conversion as will be well known to the skilled person).

The load may for example be a battery and the power provision may be in order to charge the battery. As another example, the load may be a separate device and the power provision may be in order to power this device.

In the system, the resonance circuit 201 of the transmitter resonance circuit 201 is not a fixed resonance circuit but rather is a variable resonance circuit that can be controlled to be aligned to the drive frequency. In particular, the transmitter resonance circuit 201 may be adapted such that it has a resonance frequency that matches the drive frequency, i.e. the resonance frequency may be controlled to converge to the drive frequency or to be substantially the same as the drive frequency. Such a scenario is highly advantageous for operating in the resonance regime where indeed the resonance frequencies of both the power transmitter 101 and the power receiver 105 may be set to be the same as the drive frequency. This may not only improve power transfer efficiency but also improve communication based on load modulation. In particular, it may remove or reduce so-called intermodulation effects caused by differences in the resonance frequency and drive frequency.

In the specific approach, the dynamic state changes for at least one of the (resonating) components of the resonance circuit 201 are temporarily slowed (including potentially being completely stopped) for a fraction of the cycle. The approach will be described in more detail later.

The driver 203 of FIG. 2 generates a varying (and typically AC) voltage drive signal which is applied to the resonance circuit (and thus to the resonance capacitor (not shown in FIG. 2) and transmitter inductor 103). In some embodiments, the transmitter resonance circuit 201 may be a series resonance circuit, and the voltage drive signal may be applied across the capacitor and inductor. In some embodiments, the driver 203 may be coupled directly (or indirectly) to the transmit coil 103 and the voltage drive signal may be provided to the transmit coil 103.

Thus, in the system, the driver 203 generates a drive signal which is fed to the transmitter resonance circuit 201/transmit coil 103, causing the transmit coil 103 to generate the power transfer signal providing power to the power receiver 105. The drive signal is generated to have a given frequency referred to as the drive frequency, i.e. the drive frequency is the frequency of the drive signal.

Figure 3:
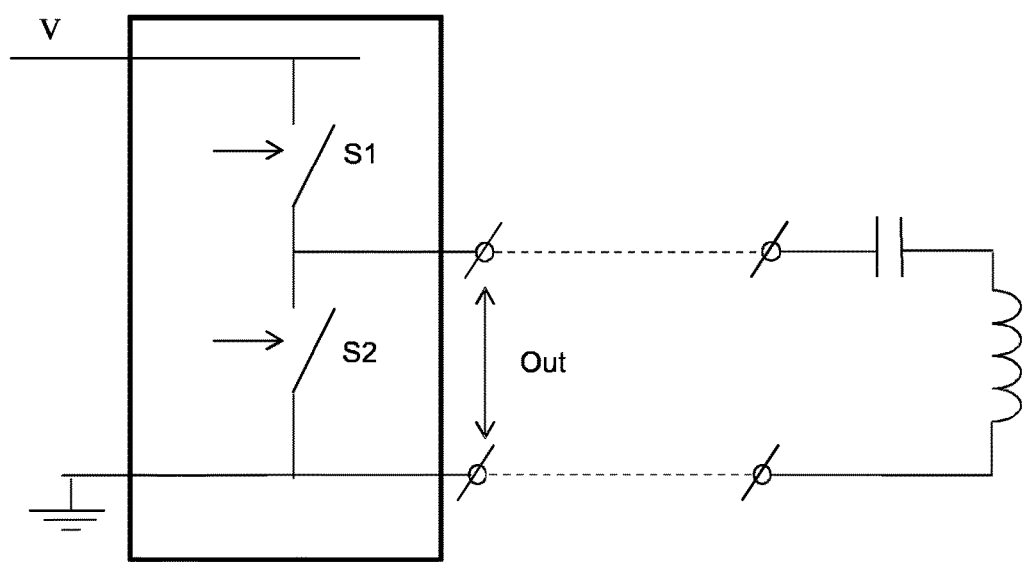
FIG. 3 illustrates an example of elements of a half-bridge inverter for a power transmitter in accordance with some embodiments of the invention.
Figure 4:
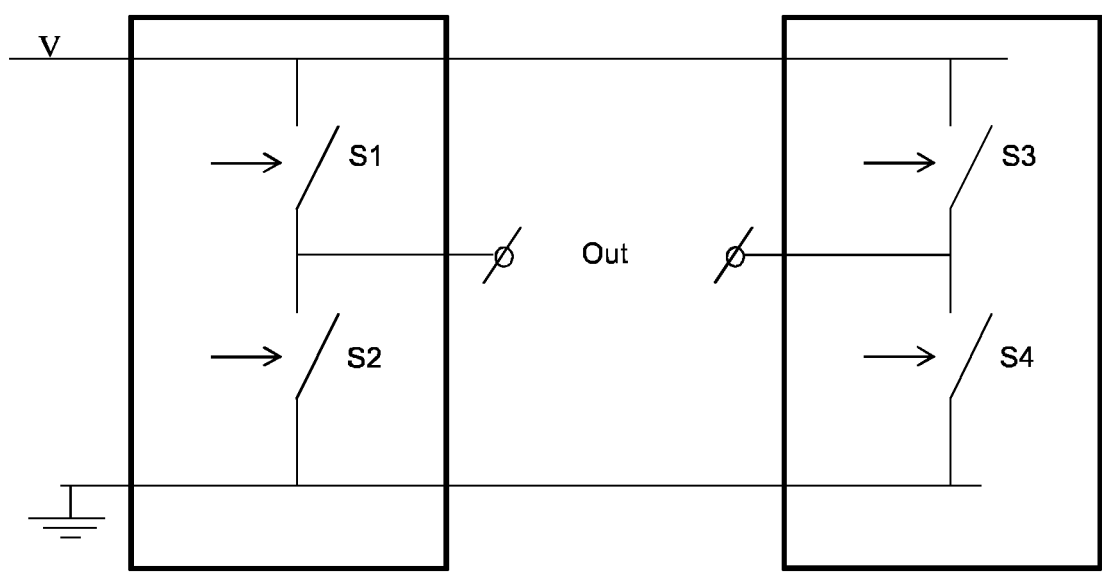
FIG. 4 illustrates an example of elements of a full-bridge inverter for a power transmitter in accordance with some embodiments of the invention.

The driver 203 generates the current and voltage which is fed to the transmitter inductor 103. The driver 203 is typically a drive circuit in the form of an inverter which generates an alternating signal from a DC Voltage. The output of the driver 203 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The above description corresponds to the case where the left and right bridge are 180° out of phase and provide the maximum output power or maximum duty cycle. However, in other scenarios, the bridge halves may be partial out of phase resulting in both S2 and S4 or S1 and S3 being closed simultaneously. In this state, the bridge voltage will be zero and thus the approach may be used to reduce the output power or duty cycle from the maximum values.

The driver 203 accordingly generates a drive signal with a given drive frequency and applies this signal to the transmitter resonance circuit 201. The transmitter resonance circuit 201 is formed by an inductive impedance and a capacitive impedance.

In the system of FIGS. 1 and 2, a particularly advantageous way of controlling the resonance frequency is provided. In the approach, the power transmitter comprises functionality for aligning the resonance frequency of the transmitter resonance circuit 201 with the drive frequency by slowing a state change for at least one of a capacitive impedance and an inductive impedance of the transmitter resonance circuit 201 for a fractional time interval of each of at least a plurality of cycles of the drive signal (but not for the entire cycle). The approach thus controls the resonance frequency to approach the drive frequency by slowing a state change of at least one of the reactive impedances. The slowing of the state change results in the effective resonance frequency being reduced such that it is closer to the drive frequency than it would be if no slowing of the state change were applied.

Specifically, the resonance circuit may have a resonance frequency corresponding to the inductive and reactive impedance when freely resonating. This frequency is referred to as the natural resonance frequency of the resonance circuit. The natural resonance frequency thus corresponds to the resonance frequency of a resonance circuit comprising only the inductive and reactive impedance. The slowing of the state change extends the corresponding cycle and accordingly reduces the frequency at which the resonance circuit is operating. This reduced frequency is referred to as the effective resonance frequency of the resonance circuit.

Thus, in the system, the transmitter resonance circuit has a natural resonance frequency corresponding to the resonance frequency of the capacitive and inductive impedance when these are allowed to freely oscillate. However, the slowing of the state change reduces the speed of the state change of at least one of the impedances relative to the speed of the state change when the impedances are allowed to oscillate freely. The slowing of the state change thus extends the cycle time relative to the freely oscillating capacitive and inductive impedances. The increase of the cycle time corresponds to a reducing of the resonance frequency and thus due to the slowing of the state change, the transmitter resonance circuit will oscillate at an effective resonance frequency which is lower than the natural resonance frequency.

Thus, in the approach, the transmitter resonance circuit 201 is not allowed to freely oscillate at the natural frequency given by the capacitive impedance and the inductive impedance but rather the resonating is controlled by the state change of (at least one of) the impedances being slowed (specifically stopped) for a part of the cycle. This results in a reduced effective resonance frequency of the transmitter resonance circuit 201. Thus, the transmitter resonance circuit 201 is controlled to have an effective resonance frequency which is lower than the natural resonance frequency given by the impedances, i.e. by a frequency which is lower than $$f_n = \frac{1}{2\pi\sqrt{LC}}$$

where L and C represents the combined inductance and capacitance of the transmitter resonance circuit 201.

Figure 5:
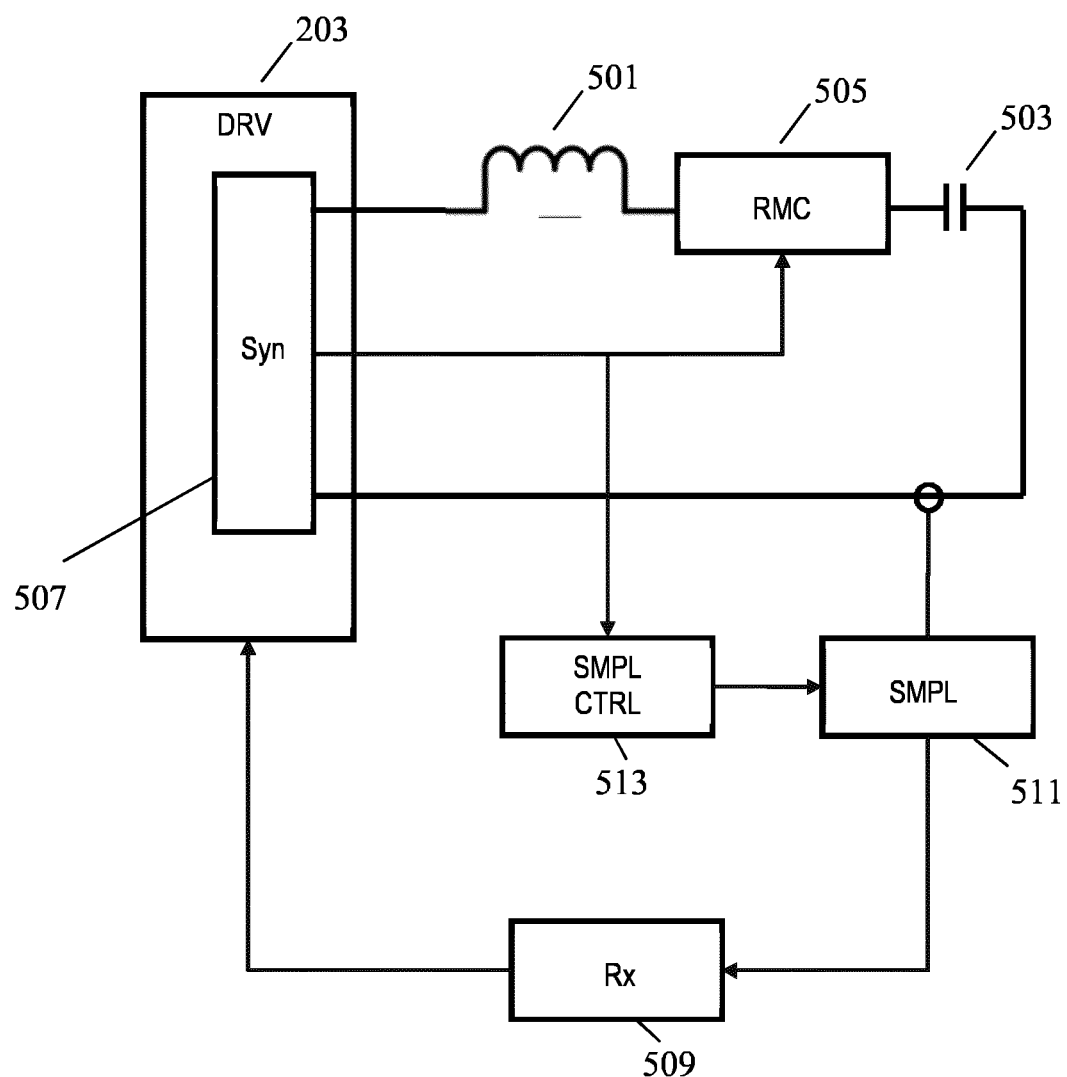
FIG. 5 illustrates an example of elements of a power transmitter in accordance with some embodiments of the invention.

FIG. 5 illustrates elements of a power transmitter wherein the effective resonance frequency is reduced be slowing the state change for a fractional time interval of some, and typically all, cycles.

In the example, the power transmitter comprises an inductive impedance 501 and a capacitive impedance 503 forming a resonance circuit.

In the specific example, the inductive impedance 501 corresponds directly to an inductor but it will be appreciated that in other embodiments the inductive impedance 501 may be any e.g. one port/two-terminal element which has an at least partial inductive impedance, i.e. which has an inductive reactance component, or in other words which has a complex impedance with a positive imaginary part. Thus, the inductive impedance 501 may be a linear two-terminal circuit or (equivalent) component for which the voltage at the terminals is at least partly dependent on a derivative of the current through the component/circuit.

Similarly, in the specific example, the capacitive impedance 503 corresponds directly to a capacitor but it will be appreciated that in other embodiments the capacitive impedance 503 may be any e.g. one port/two-terminal element which has an at least partial capacitive impedance, i.e. which has a capacitive reactance component, or in other words which has a complex impedance with a negative imaginary part. Thus, the capacitive impedance 503 may be a linear two-terminal circuit or (equivalent) component for which the current through the circuit/component at the terminals is at least partly dependent on a derivative of the voltage across the terminals.

It will be appreciated that in most embodiments, the resistive part of the inductive and capacitive impedances 501, 503 will typically be much smaller, and often negligible, compared to the reactance component. This will ensure that the oscillations are relatively undamped, i.e. it will provide a relatively high Q for the resonance circuit.

For clarity and brevity, the following description will focus on the inductive impedance being an (ideal) inductor 501, and specifically being the transmitter inductor 103 of FIGS. 1 and 2, and the capacitive impedance being an ideal capacitor 503. However, it will be appreciated that any reference to inductor 501 may as appropriate be replaced by a reference to an inductive impedance or reactance (including the transmitter coil 103), and that any reference to capacitor 503 may as appropriate be replaced by a reference to a capacitive impedance or reactance. For brevity, the pair of the inductor 501 and the capacitor 503 will also be referred to as the resonating components.

The inductor 501 and capacitor 503 are coupled together in a resonant configuration. In the example, the inductor 501 and capacitor 503 are coupled in series resonance but it will be appreciated that in other embodiments they may be coupled in a parallel resonance configuration.

The inductor 501 and capacitor 503 will exhibit a natural resonance frequency corresponding to the resonance frequency of a resonance circuit comprising only the inductor 501 and the capacitor 503. As is well known, the resonance frequency for such a circuit is by $1/2\pi\sqrt{LC}$ where L is the inductance of the inductor 501 and C is the capacitance of the capacitor 503.

However, in the system of FIG. 5, the power transmitter further comprises a resonance modification circuit 505 which is arranged to control the resonance frequency for the transmitter resonance circuit by slowing a state change for the capacitor 503 and/or the inductor 501. The resonance modification circuit 505 can be considered part of the transmitter resonance circuit (or may be considered fully or partly external to this). It will also be appreciated that although the resonance modification circuit 505 is in FIG. 5 shown as single two terminal element coupled in series between the inductor 501 and the capacitor 503, this is merely an example and that other configurations will be used in other embodiments. For example, the resonance modification circuit 505 in the example of FIG. 5 has only two terminals but it will be appreciated that in other embodiments, the resonance modification circuit 505 may have more terminals and may be connected to other parts of the circuit, including e.g. to power supply rails for the driver 203.

The resonance modification circuit 505 is arranged to modify the resonance frequency by slowing a state change for one or both of the inductor 501 and the capacitor 503. The state of the inductor 501 and the capacitor 503 may be considered to be represented by the current energy values for the component, and specifically may be considered to correspond to the current of the inductor 501 ($E=\frac{1}{2}LI^2$) and the voltage of the capacitor 503 ($E=\frac{1}{2}CV^2$).

In a conventional resonance circuit formed by a capacitor and inductor, the resonance is achieved by the continuous and periodic phase change that results from the energy flow back and forth between the capacitor (where energy is stored as electrical potential energy) and the inductor (where energy is stored as magnetic potential energy). The speed of state changes and the energy flow in such a system are given by the values of the capacitor and the inductor and this results in the oscillations at the natural resonance frequency of $$f_n = \frac{1}{2\pi\sqrt{LC}}.$$

However, in the system of FIG. 5, the resonance circuit is not allowed to simply perform a free running oscillation but rather the resonance modification circuit 505 slows down the state change for at least one of the inductor 501 and the capacitor 503 during a fractional time interval of some, and typically all of cycles.

The state change is thus slowed during the fractional time interval relative to the state change of a free running resonance circuit comprising only the capacitor 503 and the inductor 501. For at least another time interval within the cycle, the state change is not slowed (or at least the slowing is at a lower rate).

Specifically, the state change is slowed by impeding the energy flow between the capacitor 503 and the inductor 501 (by slowing the energy flow from the inductor 501 to the capacitor 503, from the capacitor 503 to the inductor 501, or both from the inductor 501 to the capacitor 503 and from the capacitor 503 to the inductor 501). In a resonant circuit positive current flows from the inductor 501 to the capacitor 503 for half of a resonating cycle, and from the capacitor 503 to the inductor 501 for the other half of a resonating cycle. In many embodiments, the slowing of the energy flow may be achieved by impeding the current flowing between the resonating components. In many embodiments, the resonance modification circuit 505 may be arranged to impede current from the inductor 501 to the capacitor 503, e.g. by leading (some or all of the) current of the inductor 501 away from the capacitor 503 (including potentially leading both negative and positive currents away from the capacitor 503). In other embodiments, the resonance modification circuit 505 may be arranged to impede current from the capacitor 503 to the inductor 501, e.g. by disconnecting the capacitor 503 from the inductor 501 during the fractional time interval (thereby also setting the voltage across the inductor to zero, i.e. both the current and the voltage is set to zero for the inductor).

In these examples, the current flow between the resonating components is thus reduced or even prevented completely during (only) the fractional time interval. During this fractional time interval, the state change of at least one of the components will be slowed or stopped completely. If this is performed during a number of cycles, and specifically in every cycle, the effect will be that the resonance circuit will behave as if resonating at a lower frequency than the natural resonance frequency for the free running resonance circuit configuration.

The resonance modification circuit 505 may in this way control and adjust the effective resonance frequency to be lower than the natural resonance frequency. The actual effective resonance frequency is in the system of FIG. 5 controlled by the resonance modification circuit 505 being capable of varying the timing/duration of the fractional time interval. Thus, the longer the fractional time interval is, the larger the effect of slowing the state change will be, and thus the lower will be the effective resonance frequency.

The cycle time is divided into at least a first fractional time interval in which the energy state change of at least one of the capacitive impedance and the inductive impedance is slowed and at least a second fractional time interval where the energy state change is not slowed. In the specific example, the cycle comprises two first fractional time intervals in which the energy state change of at least one of the capacitive impedance and the inductive impedance is slowed and two second fractional time intervals where the energy state change is not slowed, since the operation is performed twice per cycle (once by zero crossing/half period).

As a descriptive example, in the second fractional time interval, all the energy flowing out of one of the impedances is going to the other impedance (except for any potential losses e.g. in (possibly parasitic) resistive components. However, during the first fractional time interval, at least some of the energy flowing out of one of the impedances is diverted away from the other impedance. Specifically, in the second fractional time interval, all the current of one of the impedances is going to the other impedance (except for any potential losses). However, during the first fractional time interval, at least some of the current from one of the impedances is diverted away from the other impedance. Thus, in the first fractional time interval, the currents in the two impedances are not the same and at least some of the current is diverted away.

As another example, in the second fractional time interval, energy flow between the components may be allowed with all the energy flowing out of one of the impedances going to the other impedance (except for any potential losses e.g. in (possibly parasitic) resistive components. However, during the first fractional time interval, the energy flow may be restricted and reduced. For example, a maximum energy flow may be introduced, and specifically a maximum current flow may be imposed. As a specific example, any energy flow between impedances may be prevented during the first fractional time interval, e.g. the capacitive and inductive impedance may be disconnected from each other (e.g. at the time when the current through the inductive impedance is zero).

Thus, in the system, the energy state change of at least one of the conductive and inductive impedances is constrained during the fractional time interval but not during at least one other time interval of the cycle.

In particular, the energy flow may be unconstrained immediately prior to the start of the fractional time interval and immediately following the fractional time interval whereas it is constrained in the fractional time interval. Thus, slowing of the state change occurs in the fractional time interval but not immediately prior to or after the fractional time interval. Thus, the slowing of the state change begins at the start time of the fractional time interval, takes place during the fractional time interval (i.e. for less than a cycle time) and stops at the end of the fractional time interval.

It will be appreciated that the control of the timing of the fractional time intervals, both in terms of the duration and exact start and end-times may depend on the specific preferences and requirements of the individual embodiment.

However, in the specific approach, the transmitter resonance circuit 201 is controlled in dependence on the drive signal driving the transmitter resonance circuit 201 thereby inherently allowing the operating frequency and the transmitter resonance frequency to be automatically linked/locked together. Indeed, the approach allows the operating frequency and transmitter resonance frequency to automatically and inherently be substantially the same such that the system can simply adapt the operating/drive frequency of the drive signal with the effective transmitter resonance frequency automatically and inherently being adapted to directly follow. The approach can specifically ensure that each cycle of the effective resonance of the transmitter resonance circuit 201 has the same duration as the corresponding cycle of the drive signal. In addition, the approach allows for this to be achieved with very low additional complexity and with a very low control overhead.

In the specific exemplary system of FIG. 5, the resonance modification circuit 505 is thus not merely independently controlled to provide a desired resonance frequency. Rather, the operation of the resonance modification circuit 505 is closely integrated with the driving of the resonance circuit 201 and thus with the power transfer and general operation of the power transfer system.

Specifically, in the system of FIG. 5, the driver 203 generates a timing signal and feeds this to the resonance modification circuit 505. The timing signal includes transitions that indicate when the fractional time interval should start, end, or often both (there may be other transitions that are ignored). The resonance modification circuit 505 is arranged to align the fractional time intervals to these transitions. A transition is typically a change in a signal parameter, such as typically a change in a signal level. However, in some scenarios, a transition may be a change in another signal parameter, such as for example a change in a phase or frequency of a signal or a (partial) signal component of a signal.

Thus, the transitions of the timing signal controls the timing of the fractional time interval, and specifically controls a start-time, an end-time or both the start and end-time. The resonance modification circuit 505 accordingly sets the start and/or end-time of the fractional time interval from the timing signal. Typically, the timing signal is a switch signal which is used to control a switch of the resonance modification circuit 505 which can activate/deactivate the impeding of the energy flow, i.e. it can activate/deactivate the slowing of the state change. The timing signal may include transitions which can be detected by the resonance modification circuit 505 and used by this to directly or indirectly control a switch for switching in and out current impeding. The resonance modification circuit 505 typically aligns a start or end-time with the transitions by switching the slowing in or out substantially at the same time as the corresponding transition (say within $1/50^{th}$ of a cycle time period).

Thus, in the system, the driver 203 controls at least part of the timing of the fractional time interval. Furthermore, the driver 203 is arranged to control the timing signal such that this, and accordingly the fractional time interval, is synchronized to the drive signal. Specifically, the driver comprises a synchronizer 507 which generates the timing signal and time synchronizes this to the drive signal.

Specifically, as will be described with specific examples later, the start and/or end-time may be generated to have a fixed time offset to the time of an event within the individual cycles of the drive signal. The event may specifically be the drive signal crossing a signal level threshold (such as e.g. at a zero crossing), when an extreme occurs (a local or global (within the cycle) maximum or minimum), when a transition occurs (e.g. an edge of a square drive signal), or when a switch of a switch circuit (such as a switch bridge corresponding to the example of FIG. 3 or 4) switches. Thus, the start and/or stop time is controlled to have a fixed time offset relative to the time instant of such an event. Accordingly, if the timing of the event in a cycle changes (e.g. due to a change in the frequency/time period of the cycle of the drive signal), the controlled start and/or stop time will change accordingly.

In many embodiments, one of the start and stop times may be controlled to have a fixed time offset with respect to a switch time of a switch circuit generating the drive signal, whereas the other time is controlled to have a fixed time offset relative to a time instant of a signal of at least one of the capacitive impedance 503 and the inductive impedance 501 crossing a threshold.

For example, a diode and a switch may be coupled in series and used to direct current away from the capacitive impedance 503 (e.g. by short circuiting the capacitive impedance 503 or by short circuiting the connection between the capacitive impedance 503 and the inductive impedance 501 to a rail voltage (e.g. of zero)). In this arrangement, the switch may be open such that when the voltage over the capacitor (or of the connection point) crosses a threshold corresponding to the diode, this will start to conduct. Thus, the start-time is given by the signal crossing the threshold. However, the end-time is determined to have a fixed time offset relative to a switch time for the switches of a full bridge generating the drive signal. Thus, this time is directly time linked to the generation of the drive signal. Accordingly, if the time period of the drive signal increases from one cycle to the next, the resonance modification circuit 505 may automatically adapt to this change—even within the same cycle.

Thus, in many embodiments, the timing of the fractional time interval is closely linked to the drive signal. This linkage provides a close correspondence between the driving of the resonance circuit 201 and the effective resonance of the resonance circuit 201. The linking of the driving signal and timing signal specifically allows the resonance frequency to automatically be locked to be the same frequency as the operating frequency of the drive signal. Indeed, the synchronizer 507 can synchronize the timing signal, and thus the fractional time interval, such that each cycle time of the resonance circuit 201 is the same as the cycle time for the corresponding cycle of the drive signal. Thus, the approach of controlling the fractional time interval by the driver and this being based on the drive signal can provide a system wherein the resonance frequency is always the same as the drive signal. Indeed, even the individual time periods of each individual cycle time can be controlled to be the same.

The approach not only allows for low complexity, and for example does not require any measurements or detections of any signals of the resonance circuit 201 (such as inductor or capacitor current or voltage), but it can also automatically guarantee that the frequencies are identical.

The approach of aligning the transmitter resonance frequency and the drive frequency may provide a number of advantages. In particular, it may reduce, and in many embodiments prevent, intermodulation. It may also in many embodiments provide improved power transfer, and specifically may improve power transfer efficiency. Typically, the power transfer efficiency is increased the closer the transmitter resonance frequency (the resonance frequency of the transmitter resonance circuit), the receiver resonance frequency (the resonance frequency of the transmitter resonance circuit), and the operating frequency of the drive signal are to each other. The described approach allows the operating frequency and transmitter resonance frequency to be linked together while allowing them to be varied with respect to the receiver resonance frequency.

Figure 6:
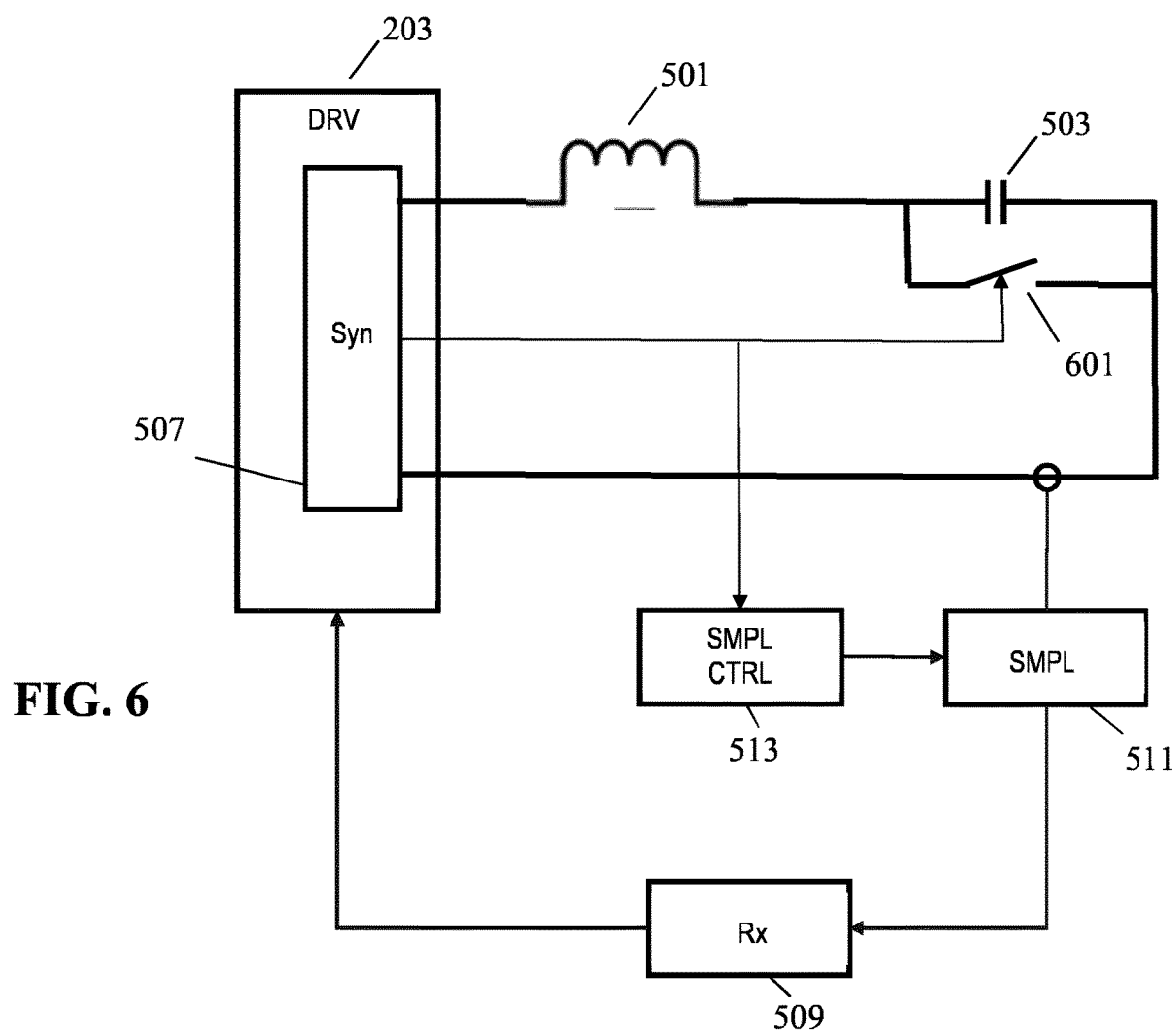
FIG. 6 illustrates an example of elements of a power transmitter in accordance with some embodiments of the invention.

FIG. 6 illustrates an example of the power transmitter of FIG. 5 wherein the resonance modification circuit 505 is arranged to slow the state change of the capacitor 503. In the example, the resonance modification circuit 505 is arranged to divert current from the inductor 501 away from the capacitor 503 during the fractional time interval. The diversion is achieved by a switch 601 which is coupled in parallel with the capacitor 503 and which is arranged to short-circuit this. Thus, the resonance modification circuit 505 may be implemented by a controllable switch.

In the example, the switch 601 is closed during the fractional time interval. The opening and the closing of the switch 601 is in the specific example controlled by the transitions of the timing signal generated by the driver 203 and is accordingly synchronized to the switch signal. When the switch is closed, the current that is flowing through the inductor 501, and which would otherwise charge or discharge the capacitor 503, is instead diverted through the switch 601. Thus, by short circuiting the capacitor 503, the current bypasses the capacitor 503 and accordingly does not charge the capacitor. In the example, switch 601 is arranged to close at a time instant corresponding to the voltage across the capacitor 503 being zero. At this time, there is substantial current through the inductor 501 (indeed the current will be at the maximum level). However, by short-circuiting the switch, this current is no longer flowing through the capacitor 503 but will instead flow through the switch 601. Accordingly, the short circuit of the capacitor 503 ensures that the voltage is maintained at zero, i.e. the state of the capacitor 503 is kept constant.

It should be noted that the switch 601 accordingly forms a current diversion path which may divert both positive and negative current from the capacitor 503.

After a certain duration, i.e. at the end of the fractional time interval, the switch is opened again thereby resulting in the current flowing through the inductor now flowing into (or out of) the capacitor 503. As a result, the capacitor 503 starts charging and the capacitor voltage changes accordingly. This will result in the effective capacitance of the capacitor 503 as "seen" from the inductor being increased and thus in the resonance frequency being reduced. The resulting effective resonance frequency will depend on the timing of the fractional time interval with increasing duration resulting in reduced effective resonance frequency.

Specifically, by short circuiting the capacitor for part of the period of drive signal, the effective capacitance will be increased.

In order to illustrate this effect, a capacitor C1 may be considered which is charged with an average current $\overline{i(t)}$ for a time t2 to a voltage U1(t2). The voltage U1(t2) may be expressed as:

$$U1(t2) = \frac{1}{C1}\int_0^{t2} \overline{i(t)}dt \rightarrow U1(t2) = \frac{\overline{i(t)}*t2}{C1}.$$

Considering instead another capacitor C2 with a smaller value than C1 but being short circuited from 0 to t1 and charged in the time interval from t1 to t2, this capacitor is charged with the same average current i(t) to voltage U1(t2). For C2 the voltage can be determined as:

$$U2(t2) = \frac{1}{C2}\int_0^{t2}\overline{i(t)}dt = \frac{1}{C2}\int_0^{t1}0dt + \frac{1}{C2}\int_{t1}^{t2}\overline{i(t)}dt \rightarrow U2(t2) = \frac{\overline{i(t)}*(t2-t1)}{C2}$$

If U1(t2) and U2 (t2) are equal at t2, then C1 can be expressed by:

$$C1 = \frac{t2}{t2-t1}*C2.$$

In other words, although capacitor C2 is smaller in value, at time t2 both capacitors are charged to the same voltage. At time t2, capacitor C2 exposes the inductor to the same voltage as capacitor C1. Thus, the effect of the short circuiting is to increase the effective (or apparent) capacitance of the capacitor as "seen" by the inductor.

Figure 7:
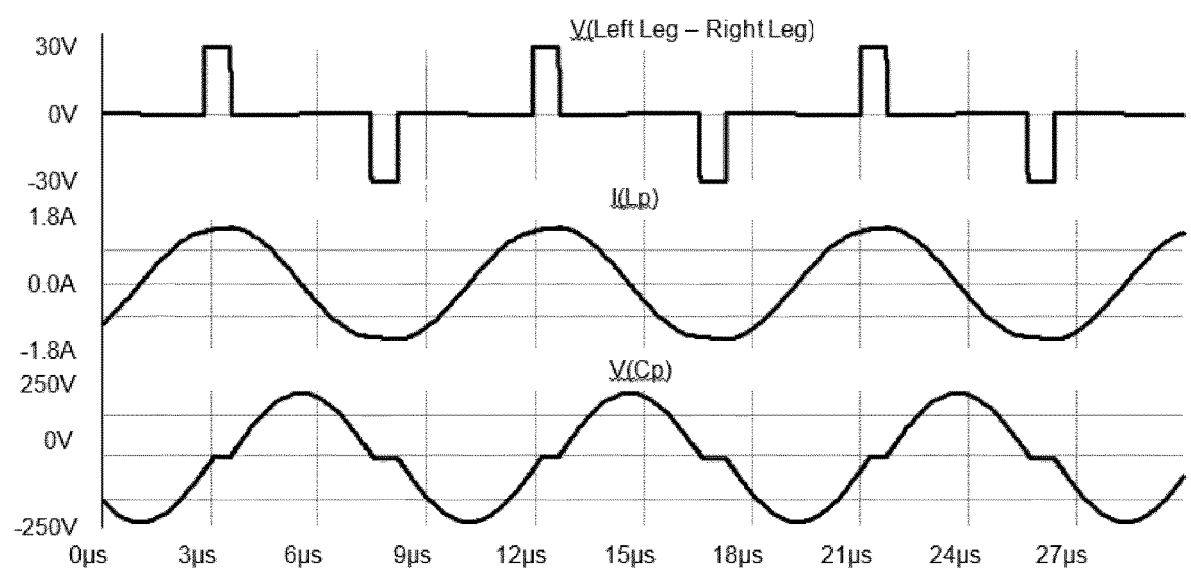
FIG. 7 illustrates examples of signals of a power transmitter in accordance with some embodiments of the invention.

An example of the signals in the circuit of FIG. 6 is provided in FIG. 7. In the example, the inductance of the inductor 501 is Lp=200 uH and that capacitance of the capacitor 503 is Cp=8.2 nF resulting in natural resonance frequency of:

$$fp = \frac{1}{2\pi*\sqrt{Lp*Cp}} = 125 \text{ kHz}.$$

In the example, the upper curve shows the drive signal.

As can be seen, for each cycle, the switch 601 is arranged to short circuit the capacitor 503 during a first fractional time interval (for a positive zero crossing of the capacitor voltage) and during a second fractional time interval (for a negative zero crossing of the capacitor voltage). In each fractional time interval, the voltage is thus kept constant for approximately 1 μs. During this time, the voltage of the capacitor 503 does not change. Similarly, the current through the inductor 501 hardly change either (it is almost constant at the maximum value) due to the inductor 501 not being exposed to a voltage.

As can be seen, the effective resonance frequency is lowered, and indeed in the example, an effective resonance frequency of around 102 kHz is achieved.

The exact effective resonance frequency can be set simply by adjusting the duration of the fractional time intervals. The longer the duration, the lower the frequency.

Further, it can be seen that if the duration between the drive signal pulses is kept constant, the operating frequency of the drive signal can be changed by the duration of the drive signal pulses changing. However, this will directly result in the right edge of the timing signal changing in the same way, and by keeping the left edge of the timing signal coupled to the zero crossing of the capacitor it results in the fractional time intervals changing correspondingly. Accordingly, the resonance frequency will directly follow the drive signal operating frequency and will inherently be the same.

Thus, the approach may effectively tie the drive frequency and the transmitter resonance frequency together such that these are effectively substantially identical.

The approach may in particular improve load communication in many wireless power transfer systems. Indeed, the system of FIGS. 5 and 6 comprise a load modulation message receiver 509 which is arranged to receive messages from the power receiver 105 where the messages are load modulated onto the power transfer system. In the example, the load modulation is performed at least partly by a varying load. In many embodiments, the load modulation may be performed by the power receiver switching in and out a capacitor in parallel to the power receive coil.

On the physical level, the communication channel from the power receiver 105 to the power transmitter 101 is implemented using the power transfer signal as a communication carrier. The power receiver 105 transmits data messages by modulating the load of the receiver coil 107. The power receiver 105 may for example do this by connecting and disconnecting a capacitor coupled in parallel to the receive coil 107 thereby changing the resonance, and thus load characteristics of the power receiver 105. These changes result in corresponding variations in the power transfer signal at the power transmitter side, and specifically in variation in the current and voltage of the transmitter inductor 103. These changes are directly or indirectly detected by the power transmitter 101 and used to demodulate the load modulation data from the power receiver 105.

Specifically, the load modulation may e.g. be detected by a change in the amplitude and/or phase of the drive signal current/voltage, by a change in the current/voltage of the transmitter inductor 103, and/or a change of current/voltage of a resonance circuit. As another example, the load modulation may be detected by a change in the current of the power supply to the driver 203 (specifically to the inverter/switch bridge).

The power receiver 105 can accordingly load modulate data onto the power transfer signal which the power transmitter 101 can then demodulate. The approach may for example correspond to that described for Qi in "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

The load modulation is specifically used to adapt the power transfer, and in particular to implement a power control loop that continuously adapts the transmitted power level based on power control messages received from the power receiver 105. The power control messages are communicated by load modulation.

Thus, the load modulation results in variations in e.g. the transmitter inductor current and this may be measured and demodulated as will be known to the skilled person. Accordingly, in the example, the power transmitter comprises a message receiver 509 for detecting messages load modulated onto the power transfer signal by a varying reactive load.

However, intermodulation distortion (resulting from differing drive frequencies and transmitter resonance frequencies) can degrade load modulation communication. Considering a high Q resonance circuit, if the driver 203 applies a signal at a frequency that is equal to the transmitter resonance frequency, the oscillations can be sustained for a very long time, even in the presence of damping. In this case, the very high currents may flow through the circuit. However, if the driver 203 applies a signal at a frequency that is different from the resonance frequency, the system will not resonate very well, resulting in much lower current flows. In fact, in the latter case, the current and voltage signals in the circuit will contain two frequencies, namely the driving frequency and the resonance frequency, where the resonance frequency will be more pronounced with a higher Q factor of the resonance circuit. The two frequencies in the current and voltage signals lead to a beat frequency, which is referred to as intermodulation. In a wireless power transfer system, which relies on amplitude modulation caused by load modulation, this can make reliable communications difficult, if not impossible.

However, this may be effectively mitigated by controlling the transmitter resonance circuit to match the drive frequency of the drive signal. The specific approach may e.g. provide reduced intermodulation distortion by linking the drive signal and the resonance frequency via the synchronization/alignment of the fractional time intervals to the drive signal thereby allowing the operating frequency and the resonance frequency to be locked together.

As mentioned, the message receiver 509 is arranged to detect load modulation of the power transfer signal. The demodulation performed by the message receiver 509 is based samples of the coil through or voltage over the transmitter coil 103. Accordingly, the message receiver 509 is coupled to a sampler 511 which is arranged to sample at least one of a current through the transmitter coil 103 and a voltage over the transmitter coil 103.

The sampler 511 is arranged to sample the relevant signal (coil current or coil voltage) at sample times which are typically periodically repeating times. Sample times may equivalently be referred to as time instants, i.e. the terms refer to the times at which the signal is sampled. It will be appreciated that the term sample time and sample instant refer to the timing of the samples and that although the sample durations may typically be sufficiently short to be considered instantaneous (corresponding to a Dirac pulse sampling), the terms are not intended to be limited to this specific scenario. Indeed, in practice, it is not possible to perform instantaneous sampling and all samples will reflect the signal over a time interval. However, typically such durations are sufficiently short to be insignificant, e.g. they may be in the order of a few nanoseconds, and the samples can be considered instantaneous.

Nevertheless, it will be appreciated that the described approach may also be used with individual sampling durations that cannot be considered instantaneous. For example, a sample may be generated as the average or integrated signal value over a slightly longer time interval, say over 1-10 micro seconds. In such cases, the term sample time (or equivalently sample instants) may refer to a fixed time for such intervals, such as e.g. the start, end or center time. Further, the skilled person will be aware of sampling theory and the impact, compensation and handling of increased sample times (such as e.g. that increased sample durations applies a sinc(f) frequency shaping which e.g. may be compensated by a corresponding 1/sinc(f) filter). Accordingly these will not be described further in the following which will focus on the sampling being instantaneous at the sample times/instants.

Further, the following description will focus on the demodulation being based on samples of the coil current. However, the skilled person will appreciate the described principles may equally be applied to demodulation based on samples of the coil voltage.

Thus, in the specific example, the sampler 511 generates samples of the coil current at respective sample times. These samples are fed to the message receiver 509 which proceeds to demodulate the load modulated data. The load modulation results in a change in the coil current and thus the sample values will depend on the state of the load modulation load at the power receiver. For example, if the power receiver uses a resistive load that is switched in or out to provide load modulation, the sample values will (ideally) be different dependent on whether the modulation load is switched in or not. Different data symbols are accordingly associated with different patterns of the load modulation, and thus result in different variations in the coil current and in different sample values. The message receiver 509 can accordingly compare the received sample values to the patterns corresponding to the different data symbols and decode the symbol as that associated with the pattern most closely resembling the pattern of the sample values.

The exact demodulation approach will depend on the specific requirements and preferences of the individual embodiment. For example, the message receiver 509 may use low pass filters, matched filters etc. as will be well known to the skilled person.

The sampling is typically performed with a relatively high sample rate or frequency relative to the duration of the individual data symbols and bits. In many embodiments, one sample is generated for each cycle of the power transfer signal, i.e. the sample rate is controlled to correspond to the drive frequency. Further, the drive frequency is linked to the transmitter resonance frequency so the sample rate is further set to correspond to the transmitter resonance frequency.

However, an important and critical parameter for achieving good communication performance is the timing of the samples, and specifically the timing of the samples relative to the operation and signals of the resonance circuit. In particular, in order to optimize communication performance and specifically reduce error rates, it is important that the samples reflect the maximum difference between the sampled current (or voltage) values for the different states of the modulation load, i.e. it is important that the difference between sample values for different states of the modulation load is as large as possible. The difference is also referred to as the modulation depth (or more generally the term modulation depth refers to the differences in the inductor current (samples) for different bits/symbols).

However, complicating the operation is the fact that the modulation depth varies for different sampling times during a cycle. For example, if all samples are generated at time instants corresponding to zero crossings for the inductor current, there is no difference for the different modulation load states. Thus, it is important for the sampling times to be at optimal or at least suitable times. Specifically, it is important to select the appropriate sample time within the cycle.

However, controlling the sampler 511 to sample the signals at the appropriate time is not a straightforward issue. For example, one approach would be to use a peak detection circuit to detect the peak coil current and then use this value. However, such an approach requires additional (and typically at least partially analog) circuitry which increases complexity and potentially cost. Furthermore, e.g. trying to run a peak detection loop that seeks to control sample times to be set to the times of the detected peaks tends to result in suboptimal performance. In particular, it tends to result in inaccurate and/or slowly adapting sample times which typically introduce substantial jitter resulting in noisy samples.

In the system of FIGS. 5 and 6, the sample times are controlled in response to the timing of the fractional time intervals. Specifically, the power transmitter 101 comprises a sample time controller 513 which is coupled to the sampler 511 and which is arranged to control the sample times in response to at least one of start-times and end-times of the fractional time intervals. Thus, in the approach, the sampling times are determined in response to the times at which the slowing of the state change begins or ends. The approach is thus based on the interworking between the specific approach for controlling the resonance frequency of the resonance circuit and the demodulation of load modulation.

In the specific example, the sample time controller 513 is further coupled to the driver 203 from which it receives the timing signal which is also provided to the resonance modification circuit 505. This timing signal may in the specific example be a switch signal controlling the switch 601 of FIG. 6, i.e. it may be a timing signal which controls the short-circuiting of the capacitor 503. The timing signal may specifically have two possible states with one corresponding to the switch 601 being open and one corresponding to the switch being closed. Thus, the timing signal directly controls the switch, and thus controls the start and end of the fractional time intervals. Specifically, the timing signal has transitions at respectively the start-times and end-times of the fractional time intervals.

In the example, the sample time controller 513 controls the sampling times/instants based on the timing of the fractional time intervals, and specifically based on the transitions of the timing signal. Thus, the sample times are determined relative to the start and/or end-times of the fractional time intervals. In the approach of FIGS. 5 and 6, the fractional time intervals control the operation, and specifically the resonating of the resonance circuit is controlled by fractional time intervals. Thus, the timing of the cycle of the resonating is controlled by the timing of the fractional time intervals and therefore by timing the sampling times relative to the timings of the fractional time intervals, the sample timings can be accurately positioned within the cycle. In other words, by determining the sample times relative to the start and/or end-time of the fractional time interval, it is possible to control the sample time to be at the desired point in the modified cycle. For example, in many embodiments, a sampling of the peak current of the transmitter coil 103 can be achieved by setting the sample time with a specific time offset with respect to the start or end-time of the fractional time interval.

Figure 8:
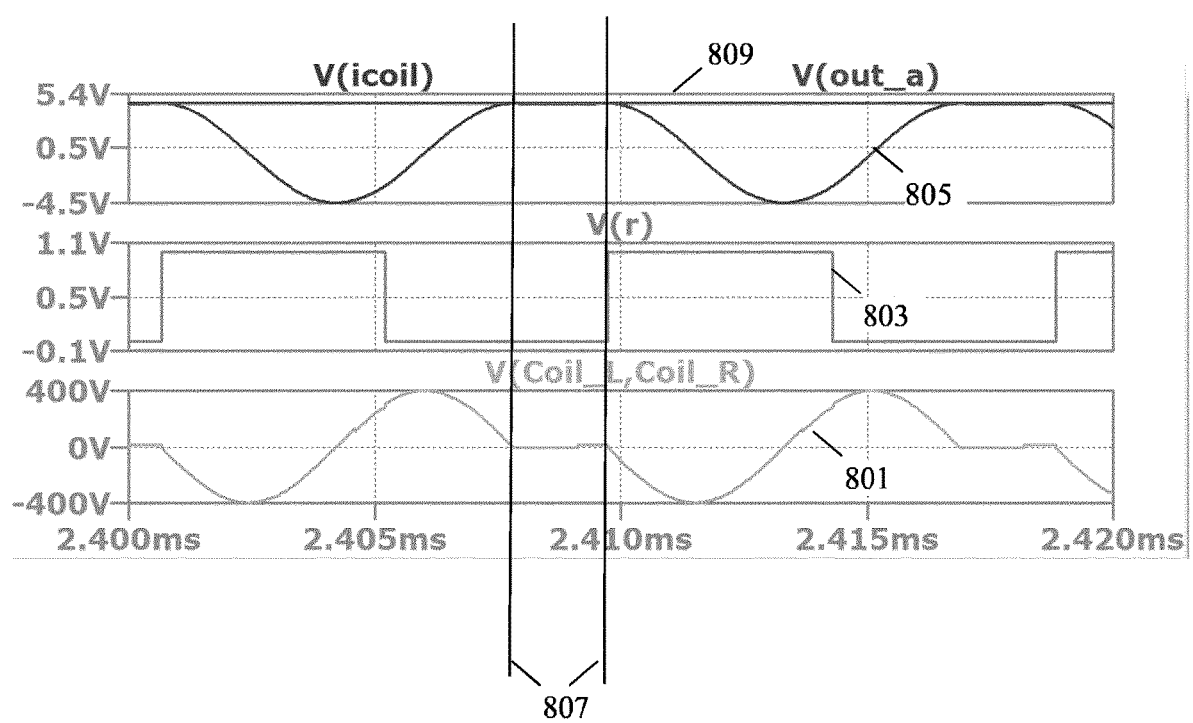
FIG. 8 illustrates examples of signals of a power transmitter in accordance with some embodiments of the invention.

The approach may be exemplified by the signals illustrated in FIG. 8. In the example, the natural resonance frequency of transmitter resonance circuit is 140 kHz and the drive frequency is 110 kHz. Due to the fractional time intervals, the natural resonance frequency is reduced to an effective resonance frequency matching the drive frequency, i.e. to 110 kHz. The resonance frequency of the receiver resonance circuit is in the example 105 kHz.

In this example, signal 801 corresponds to the voltage across the transmitter coil 103. Signal 803 corresponds to the timing signal for the right leg of a full bridge inverter of the driver 203. Signal 805 corresponds to the coil current $i_{coil}$ through the transmitter coil 103. Signal 805 is illustrated as a voltage (generated by a measurement) directly corresponding to the coil current (with 1 V=1 A in the specific example).

As illustrated, the coil voltage and coil current exhibits a cycle corresponding to a natural resonance frequency of the resonance circuit followed by a fractional time interval in which the coil voltage and coil current is kept constant (or substantially constant—during the fractional time interval the inverter may be switched off (e.g. both S1 and S3, or S2 and S4, are simultaneously off) resulting in a zero voltage over the transmitter coil 103 and constant coil current; or it may be on providing a low voltage over the transmitter coil 103 (in the example of 10V) and a small change in the coil current. In the specific example, a small change can be seen in signal 801 during the fractional time interval representing the inverter switching from being completely off to providing a driving voltage of 10V).

In the example, the fractional time interval is synchronized to the switching of the full bridge inverter, and specifically the end-time of the fractional time interval occurs at the same time as the low-to-high transition of signal 803.

In the example, the fractional time interval is arranged to start at the time of a zero crossing of the voltage 801 over the transmitter coil 103. Thus, fractional time intervals are formed as time intervals having a start-time at the zero crossing (from a positive to negative voltage) of the voltage over the transmitter coil 103 and end-times at the time the right leg of the full bridge inverter of the driver 201 is switched off. An example of the fractional time interval in one cycle is in FIG. 8 indicated by the vertical lines 807.

In the system, the sample times are, by the sample time controller 513, determined relative to the start-times and/or the end-times of the fractional time intervals. In the specific example, the switch 601 may be provided with a switch timing signal which controls when the switch 601 is opened and closed, and thus with the timing for the fractional time intervals. This signal is also fed to the sample time controller 513 which proceeds to determine the sample times based on the transitions of the timing signal.

As illustrated in FIG. 8, the fractional time interval in the specific example freezes the state of the inductor and capacitor during the fractional time interval. Thus, substantially no change occurs during the fractional time interval. However, outside of the fractional time intervals, the resonance circuit is allowed to resonate freely. Furthermore, as the fractional time interval is initiated in response to a zero detection, and the states of the resonating components are kept constant during the fractional time intervals, each cycle of the resonating operation is formed by a standard resonating cycle (with a cycle time equal to the reciprocal of the natural resonance frequency) and a fractional time interval. Thus, the longer the fractional time interval, the higher the effective cycle time and the lower the effective resonance frequency.

Further, as the operation outside the fractional time intervals are fixed by the resonating components, the variation in the effective resonance frequency is caused by variation in the duration of the fractional time intervals. Accordingly, in the system where the timing of the fractional time interval is used to control the sampling times, it is possible to set the sampling times to correspond to the desired point of the signal in each cycle, such as for example a peak value.

As a specific example, the timing instants may be set to be identical to the end-times of the fractional time intervals or the start-times of the fractional time intervals. Indeed, in the example, the state of the resonance circuit is frozen at a time corresponding to the zero crossing of the voltage over the transmitter coil 103. However, this also corresponds to the time instant of the maximum coil current. Thus, at the start-time of the fractional time interval, the coil current is at a maximum level and therefore a sampling synchronized to the timing of the fractional time intervals such that the sampling is performed at the start-time of the fractional time interval will result in the sampling being of the peak coil current. This can be achieved without requiring any additional functionality such as peak detection circuitry.

Furthermore, as the state of the resonance circuit is frozen during the fractional time interval, the current value at the start of the fractional time interval will be maintained throughout the fractional time interval, and indeed the coil current at the end of the fractional time interval is still the maximum current. Therefore, the sample time controller 513 may alternatively determine the sampling instants to coincide with the end-times of the fractional time intervals and this will still result in a peak current measurement.

In many embodiments, the sample time controller 513 may accordingly be arranged to determine the sampling times to fall within the fractional time intervals. This will in many embodiments (such as that represented by FIG. 8) result in a sampling of the coil current at a maximum value. Indeed, in the example of FIG. 8, any sampling of the coil current within the fractional time intervals will result in a maximum current sampling as indicated by signal 809.

Thus, in some embodiments, the sampling may be synchronized with at least one of the start-times and end-times of the fractional time intervals, and specifically may be synchronized to coincide with at least one of the start-times and end-times. For example, the sample time controller 513 may control the sampler 511 to sample the current signal when the switch signal 803 transitions from a low to high value.

In many embodiments, the sample time controller 513 may be arranged to determine the sample times to be within the fractional time intervals. This may provide particularly advantageous performance in many scenarios. Specifically, due to the state change being slower during this interval, the sensitivity to sample time variations, e.g. jitter, will be substantially reduced. Indeed, for embodiments where the state change is completely frozen, the system may be insensitive to jitter occurring within the fractional time interval.

As a specific example, the sample time controller 513 may be arranged to determine the sample times as midway between the start-times and the end-times of the fractional time intervals, i.e. at the center time of the fractional time intervals (it will be appreciated that due to the periodic nature of the fractional time intervals, the end-time of a current fractional time interval can be determined with high accuracy from the end-times of previous fractional time intervals). In such an embodiment, a large degree of jitter, and/or an extended sampling duration, will typically be acceptable as long as it does not extend beyond the fractional time interval.

Thus, in the described examples, the demodulation of load modulation messages is based on samples of the coil current (or in some embodiments e.g. the coil voltage) within fractional time intervals wherein a state of the resonance circuit is locked/frozen, e.g. by the short-circuiting of a resonance capacitor as illustrated in the example of FIG. 6.

In the example, the sampling of the coil current may thus result in the sampling automatically being of the peak value of the coil current. Furthermore, as the coil current is not only maximum but also substantially constant during the fractional time intervals, the approach will tend to be highly insensitive to jitter.

It will be appreciated that the exact timing of the sampling times may depend on the preferences and requirements of the individual embodiment.

However, in many embodiments the sample time controller 513 may advantageously be arranged to control the sample times in response to end-times of the fractional time intervals. Indeed, in many embodiments, only the end-times may be considered. This may provide a practical operation and implementation in many embodiments.

For example, in some implementations, the start of a fractional time interval may be instigated by a zero crossing of the voltage over the transmitter coil 103 and specifically this may be achieved by a diode from the junction point of the capacitor and inductor starting to conduct the current directly to ground (thereby bypassing the capacitor). However, this may be impractical to detect in some embodiments, and therefore it may be difficult for the sample time controller 513 to be provided with information of the start-times. However, the end-time may be determined by the switching of one or more switches of the driver output bridge and thus information of the end-times can be provided simply by using the switch signal as timing signal representing the end-times of the fractional time intervals.

Indeed, in many embodiments, such a timing signal may be used directly as the sampling control signal for the sampler 511 such that the current samples are generated for the end-times of the fractional time intervals. This may provide an efficient yet low complexity implementation.

However, in many embodiments, the sample time controller 513 may be arranged to set the sample times to precede the end-times. Specifically, the sample time controller 513 may determine the sampling times to precede the end-times by a time offset. In some embodiments, the time offset may be a fixed and e.g. predetermined time offset that is applied in all cycles.

For example, the sample time controller 513 may be arranged to determine the sample time to occur, say, 1 μsec (or e.g. even lower, say 50 ns) prior to the end-times of the fractional time intervals. This may ensure that the sampling time is performed within the fractional time intervals and thus may reduce sensitivity to jitter (which will typically be much lower than the offset). Furthermore, in many practical implementations, the switching of a switch of the driver 203 may result in additional noise and/or transition effects that possibly may degrade the sampling results. Therefore, an earlier sampling may improve the sampling performance and reduce the impact of such switching noise on the samples.

The exact time offset may depend on the preferences and requirements of the individual application. However, in many scenarios, the offset may advantageously be from zero (corresponding to a sampling substantially at the end-times) up to one half cycle time of the drive signal. However, in many embodiments, the time offset may be selected to be closer to the end-time, such as for example from one fifth or one tenth of the cycle time prior to the end-time.

In many embodiments, the time offset may e.g. be set dependent on the duration of the fractional time intervals, and thus may reflect a difference between the natural and effective resonance frequency of the transmitter resonance circuit.

For example, in some embodiments, the time offset by which the sampling precedes the end-times may be determined as half the duration of the fractional time intervals when the effective resonance frequency is the maximum value. In other words, the time offset may be selected as half the duration of the fractional time intervals when these are at the minimum value for which the system is designed. In such an embodiment, the sampling may accordingly be performed midway through the fractional time intervals when these are at the minimum value. For longer fractional time intervals (i.e. for lower effective resonance frequencies), the sampling will not be midway in the fractional time intervals but will be closer to the end-times. However, typically, the jitter etc. will be significant less than the determined time offset and thus this is unlikely to affect performance. Accordingly, a simple approach for determining the sample times can be used without degrading performance.

In many embodiments, such as for example for embodiments in accordance with the Qi Specifications for power transfer parameters, a suitable time offset may advantageously be no less than 200 nano seconds and no more than 5 μsec, and in many embodiments no more than 2 μsec or 1 μsec. This may in most embodiments result in an offset which for the range of effective resonance frequencies that may occur is sufficient to ensure that jitter will be contained within the fractional time interval, and it may reduce impact of the switching of the driver on the sampling for both the start and end-times In some embodiments, the sample time controller 513 may be arranged to control the sample times in response to start-times, and possibly only the start-times, of the fractional time intervals.

For example, in some embodiments, the timing signal fed to the sample time controller 513 may comprise transitions corresponding to the start-times of the fractional time intervals and the sample time controller 513 may be arranged to determine the sample times as times given by a time offset relative to the start-times (and specifically the corresponding transitions in the timing signal).

The time offset may typically be a fixed, and specifically predetermined time offset. For example, the sample time controller 513 may be arranged to control the sampling to be performed, say, 1 msec after a transition indicating the start of a new fractional time interval.

This approach may result in very low complexity in many embodiments. For example, in embodiments where the start of a fractional time interval coincides with the switching of a switch of the inverter of the driver 203, the sample time controller 513 may simply delay the corresponding switch signal by a suitable value and use this delayed signal as a sample trigger signal. Thus, such embodiments may utilize the advantage that a signal to which the sampling time of a fractional time interval is synchronized occurs before the sampling instant (and thus it is not necessary to consider previous fractional time intervals or estimate the fractional time interval timing).

Indeed, the approach may in some cases also be used when the start-times are not directly aligned with a timing signal for a switch. For example, a timing signal may be generated in response to a detection of a zero crossing of the coil voltage. In some embodiments where the short circuiting of a capacitor (corresponding to the example of FIG. 6) is by a diode starting to conduct, the current through the diode may be sensed and used to generate a timing signal indicative of the start-times of the fractional time intervals.

The time offset may specifically have similar values to the ones described with respect to the time offset for the end-times (i.e. many of the considerations will symmetrically apply to time offset relative the start-times as well).

In some embodiments, the sample time controller 513 may be arranged to determine the sample times in response to both the start-times and the end-times. Thus, in such embodiments, the sample times may also be dependent on the duration of the fractional time interval.

For example, the sample times may be determined as a specific internal time instant relative to both the start-times and the end-times. For example, the sample times may be determined to be midway between the start-times and the end-times. This may correspond to the sample times being positioned in the center of the fractional time intervals, and thus may provide a symmetric margin to the two ends of the fractional time intervals. It will be appreciated that other fractions between the time offsets to the start and end-times respectively may be used in other embodiments.

In some embodiments, the sample time controller 513 may determine the sample times to belong to an internal interval of the fractional time interval where the internal interval is determined in response to the start-times and end-times. For example, the internal interval may be determined to stretch from, say, 1 μsec after the start-time to, say, 1 μsec before the end-time. The sample time controller 513 may then be arranged to freely select the sample times within this interval (or e.g. in response to other factors or parameters).

The previous description has focused on scenarios wherein the state change is substantially stopped during the fractional time intervals (e.g. the state change is less than 2% of the state change that would occur in free running oscillations, for example the change in the coil current is less than 2% of the change that would occur for free oscillations). This may be advantageous in many embodiments and may specifically result in there being little or no difference between samples taken at different times within the fractional time intervals.

However, it will be appreciated that in other embodiments, the state change may be slowed rather than completely stopped. For example, rather than short-circuiting the capacitor 503 of FIG. 6, a second capacitor may be switched-in in parallel to the capacitor 503. This will slow, but not stop/freeze, the state change of the resonance circuit as the capacitor 503 will still be charged but at a lower current as some of the current will be diverted to the second capacitor.

Such a slowing of the state change will result in the coil current not being frozen at the maximum value but rather decreasing with time during the fractional time interval. However, in many embodiments, such a change in the coil current may be acceptable and the approach may still provide advantages over conventional approach.

For example, in some embodiments, a second capacitor five times larger than the capacitor 503 may be switched in during the fractional time intervals. This will reduce the effective resonance frequency from the natural resonance frequency. Furthermore, during the fractional time intervals, the change in the coil current will be slowed by a factor of six thus resulting in a much slower decrease of the current value. The sample time controller 513 may synchronize the sample times to the switching in of the parallel capacitor, e.g. by triggering a sampling, say, 500 nanoseconds after the switching-in. Although the coil current may have decreased slightly, it is still close to the peak value and provides a suitable value for load modulation. Further, sensitivity to switch noise or noise caused by jitter is substantially reduced. Further, no peak detection (or other coil current dependent) circuitry is necessary.

It will also be appreciated that although the previous description has focused on the often advantageous approach of sampling inside the fractional time intervals, this is not essential for the approach. In many embodiments, it may in fact be advantageous to sample at other times of the cycle.

Indeed, in many embodiments, it may be advantageous to sample within a short time interval (say up to 50-500 nanosec) after the end-time of a fractional time interval. Such an approach may provide a low complexity operation where the sampling e.g. can be controlled by a simple delay of e.g. a switch signal for a switch of the inverter. Further, the approach may ensure that sampling is not simultaneous with the switching in the inverter and may thus in some applications and embodiments reduce switch noise in the samples. Although the approach may result in sampling slightly after the peak value has occurred, this may often be advantageous. Indeed, the delay is introduced at a time where the change in the coil current is close to the minimum value (the derivative is zero at the time of the peak) and thus the reduction in the current value (and more importantly the difference between the current for different modulation loads) will be small.

As another example, in some embodiments, it may be advantageous to sample within a short time interval (say up to 50-500 nanosec) before the start-time of a fractional time interval. Such an approach may e.g. be achieved by estimating the start-time from start-times of previous fractional time intervals. The approach may ensure that sampling is not simultaneous with the switching in the inverter and may thus in some applications and embodiments reduce switch noise in the samples. Further, it may result in a sampling very close to the peak value and will make the sampling less sensitive to variations during the fractional time intervals. The approach may in particular be suitable for embodiments where the state change is slowed but not stopped during the fractional time intervals.

The previous text has focused on the example where the resonance modification circuit is arranged to slow the state change for the capacitive impedance 503 by diverting current from the inductive impedance 501 away from the capacitive impedance 503 during the fractional time intervals. However, in other embodiments, the resonance modification circuit 505 may be arranged to slow the state change for the inductive impedance 501 by blocking current flow from the capacitive impedance 503 to the inductive impedance 501 during the fractional time interval.

Figure 9:
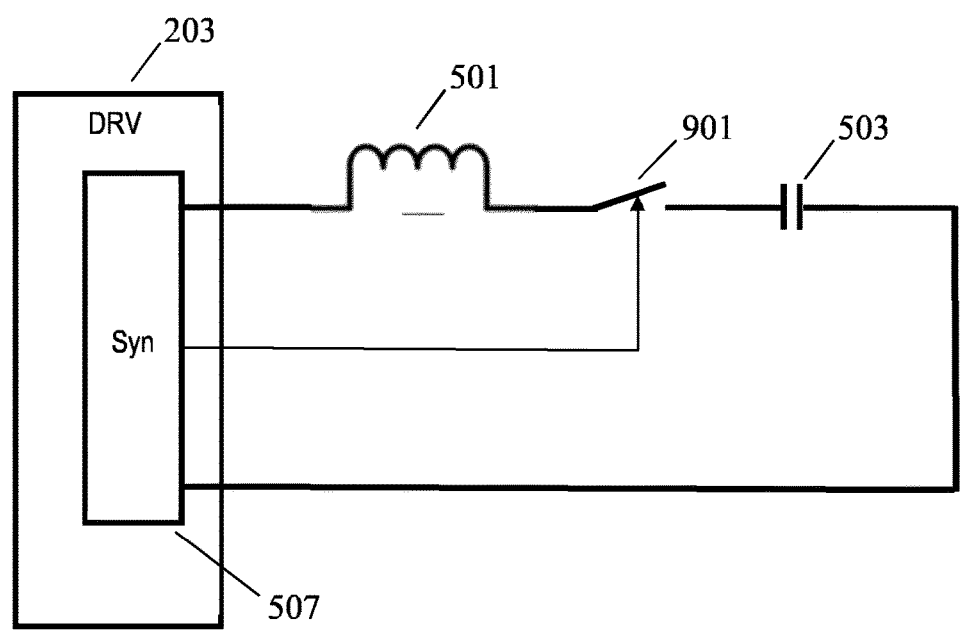
FIG. 9 illustrates an example of elements of a power transmitter in accordance with some embodiments of the invention.

For example, FIG. 9 illustrates another embodiment of the system of FIG. 5. In this example, the resonance modification circuit is arranged to slow the state change for the inductive impedance by impeding current flow (and specifically the rate of change of the current flow) from the capacitive impedance to the inductive impedance during the fractional time interval, or equivalently by reducing the voltage imposed by the capacitor over the inductive impedance. Specifically, in the example, the resonance modification circuit is arranged to slow the state change for the inductive impedance by blocking current flow from the capacitive impedance to the inductive impedance during the fractional time interval, or equivalently by setting the inductor voltage to zero.

In the example, the current from the capacitor 503 to the inductor 501 is blocked by a switch 901 which is in series with the inductor 501. In the example, the driver 203 is arranged to effectively disconnect the coupling between the capacitor 503 and the inductor 501 for part of resonance cycle. The driver 203 synchronizes the switch 901 to the drive signal, and in principle operates as described for the example of FIG. 6. Indeed, in example of FIG. 6, the switch 601 is arranged to freeze the voltage across the capacitor 503 at zero by controlling the current through the capacitor 503 to be zero. In the example of FIG. 9, the switch 901 is arranged to freeze the current through the inductor 501 at zero by disconnecting the inductor 501 from the capacitor 503 and so removing the influence of the voltage of the capacitor on the inductor. Thus, the two approaches are equivalent with the consideration that operation of a capacitor and inductor are the same when the roles of current and voltage are swapped. Indeed, the signals of FIG. 7 could also apply to the example of FIG. 9 if the curves for inductor current and capacitor voltage are swapped with respectively capacitor voltage and inductor current.

It should also be noted that in the provided examples, the state change of both the capacitor 503 and the inductor 501 are slowed, or substantially frozen, during the fractional time interval. Indeed, in the example of FIG. 6, during the fractional time interval, no current reaches the capacitor 503 and the voltage is constant at zero. However, thus also sets the voltage across the inductor 501 to zero and thus the inductor current is substantially constant, i.e. there is substantially no state change for the inductor 501. Similarly, in the example of FIG. 8, during the fractional time interval, no current can flow from the capacitor 503 and accordingly the voltage across the capacitor 503 will be substantially constant, i.e. there is substantially no state change for the capacitor 501.

In the previous examples, the start of the fractional time intervals have been synchronized with (and specifically aligned to) the zero crossings of respectively the inductor voltage and the capacitor current. In particular, the start-time of the fractional time intervals are aligned with the zero crossings of respectively the capacitor voltage and the inductor current. This provides particular advantages when the current flow between the capacitor 503 and inductor 501 is reduced completely to zero during the fractional time intervals. However, it will be appreciated that in some embodiments, more gradual reductions in the current flow may be used.

It will be appreciated that the slowing of the state change, and the energy flow between the capacitor 503 and the inductor 501, may be achieved by reducing rather than completely preventing current flow between the resonating components. The reduced current may for example be achieved through a current regulating circuit which e.g. could be controlled in real time by a microcontroller.

Figure 10:
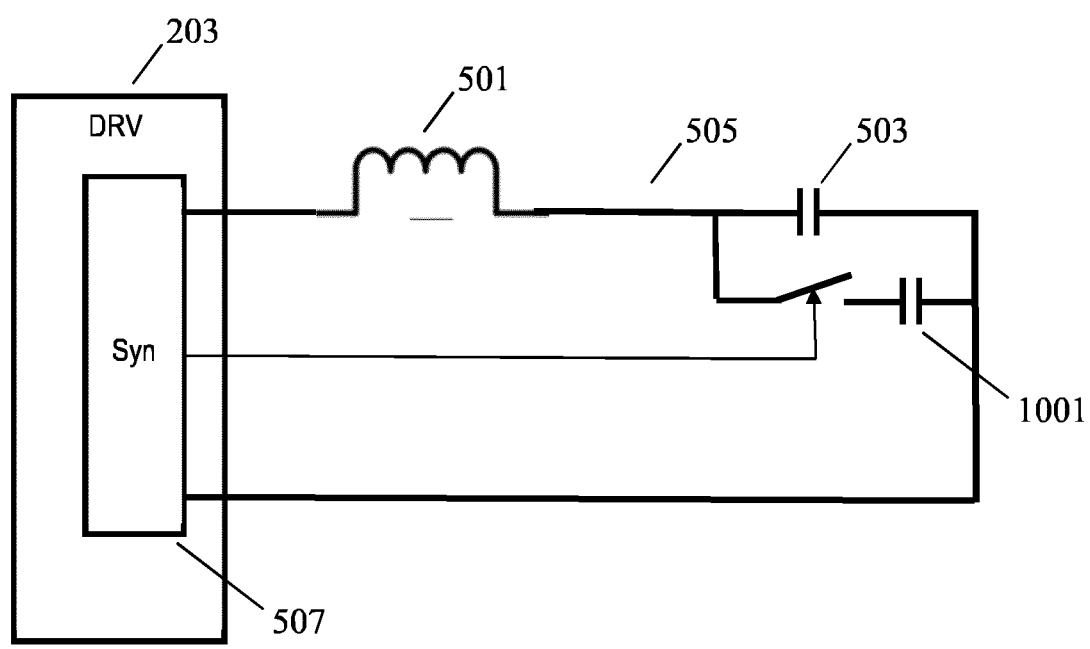
FIG. 10 illustrates an example of elements of a power transmitter in accordance with some embodiments of the invention.

However, as another example, the reduction may e.g. be achieved by including an additional capacitor or inductor during the fractional time intervals. For example, in the example of FIG. 10 an additional current reduction capacitor 1001 is inserted in series with the switch of FIG. 6. During the fractional time interval, the switch 601 does not short circuit the capacitor 503 but inserts the current reduction capacitor 1001 in parallel. This results in the current to the capacitor 503 being reduced as part of the current flows into the current reduction capacitor 1001 during the fractional time interval thereby reducing the state change of the capacitor 503 and so the voltage that the capacitor 503 imposes on the inductor. (the current reduction capacitor 1001 is charged and discharged together with the capacitor 503).

Figure 11:
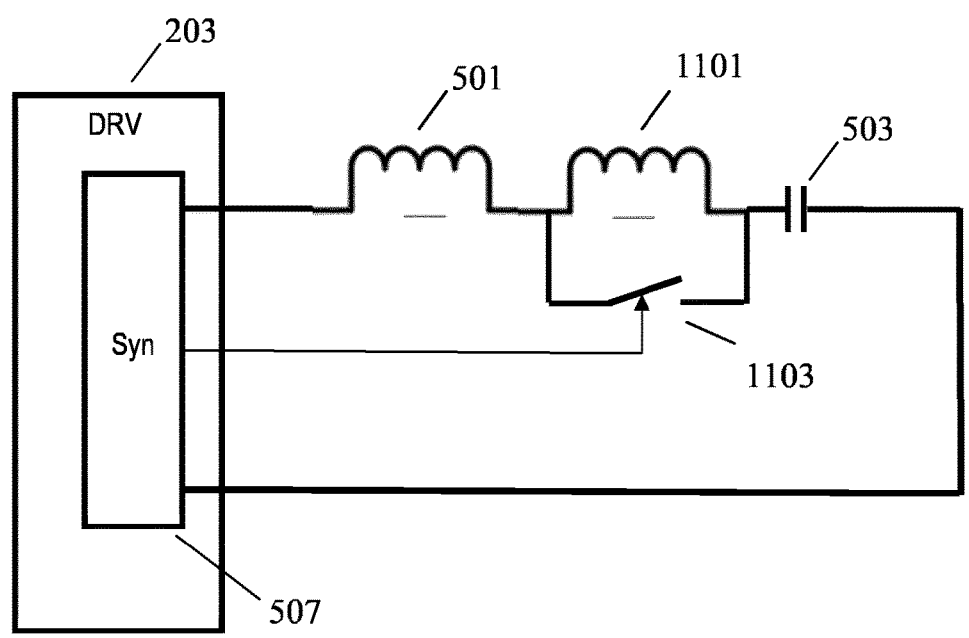
FIG. 11 illustrates an example of elements of a power transmitter in accordance with some embodiments of the invention.

The corresponding example for the inductor 501 is shown in FIG. 11. In this example, a current reducing inductor 1101 is inserted in series with the inductor 501 and the switch 1103 is coupled in parallel with the current reducing inductor 1101. In this example, the switch 1103 is open during the fractional time interval resulting in the effective inductance being increased. Accordingly, the current change through the inductor is reduced (as the voltage that the capacitor 503 imposes is now divided over the inductors 501 and 1101 and so the resulting voltage that the capacitor 503 imposes on the inductor 501 is reduced) during the fractional time interval. At the end of the fractional time interval, the switch 1103 is closed thereby short circuiting the current reducing inductor 1101.

In the following, the operation of the system will be described further with reference to a system wherein the driver 203 comprises a switching bridge/inverter for generating the drive signal. The switching bridge may specifically be a half-bridge or a full-bridge corresponding to the examples of FIGS. 3 and 4.

In the example, the driver 203 furthermore generates the timing signal to have transitions that directly control the fractional time interval. Specifically, the signal is generated to have transitions occurring at times corresponding (and typically being substantially identical, say within $\frac{1}{50}^{th}$ of a cycle time) to the start-time of the fractional time interval, at times corresponding (and typically being substantially identical, say within $\frac{1}{50}^{th}$ of a cycle time) to the end-time of the fractional time interval, or both at times corresponding (and typically being substantially identical, say within $\frac{1}{50}^{th}$ of a cycle time) to the start-time and end-time of the fractional time interval.

Furthermore, in the examples, the driver 203 is arranged to synchronize the timing signal to one (or more) of the switch signals controlling the switches of the switch bridge. Thus, as the drive signal is generated by the switching of the switches in the switch bridge, the synchronization of the timing signal, and thus of the fractional time intervals, to the switch signal also provides a synchronization to the drive signal.

Figure 12:
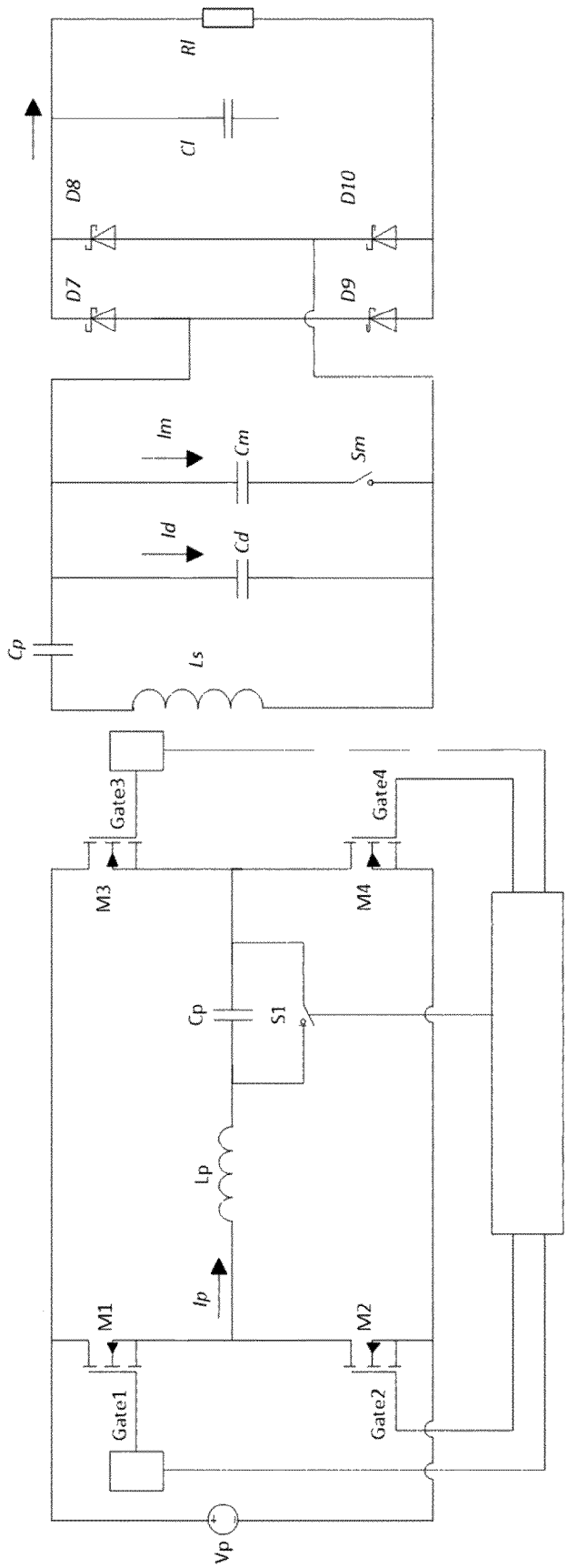
FIG. 12 illustrates an example of elements of a power transmitter and power receiver in accordance with some embodiments of the invention.

FIG. 12 shows an example of an electrical model of elements of an example of the inductive power transfer system of FIGS. 1 and 2.

The transmitter resonance circuit 201 is represented by the components $C_p$, and $L_p$, (corresponding to the capacitor 503 and the inductor 501). The driver is represented by $V_p$ and the switch bridge formed by switches M1-M4 which in the specific example are FETs. The receiver resonance circuit 205 is represented by the components $C_s$, $L_s$. The capacitor $C_d$ creates a resonance at 1 MHz, which enables power transmitters that use a moveable coil to locate the power receiver (e.g. in accordance with the principles described in the Qi Wireless Power Specification (version 1.0)). The capacitor $C_m$ and switch $S_m$ represent load modulation by the power receiver 105. Diodes $D_7$ to $D_{10}$ and $C_1$ and $R_1$ represent the load of the power receiver 105 (with the diodes providing rectification).

Figure 13:
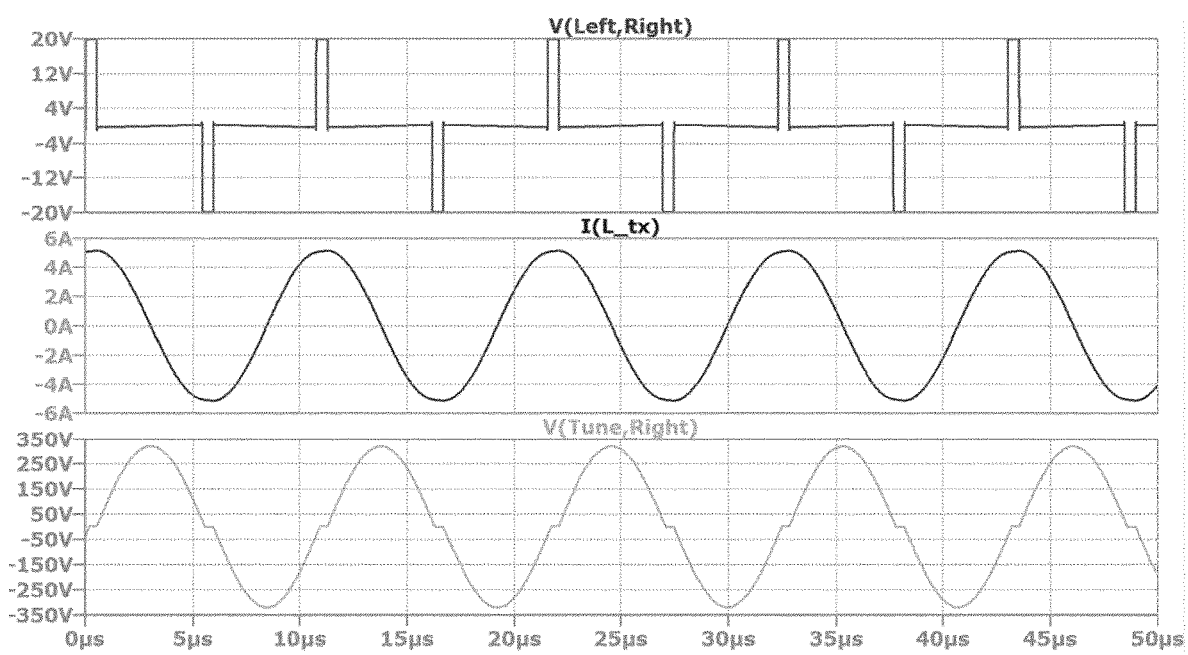
FIG. 13 illustrates examples of signals of a power transmitter in accordance with some embodiments of the invention.

In the example, when switch S1 is opened and closed with an appropriate duty cycle the effective capacitance becomes larger than the capacitance of the capacitor 503 ($C_p$) on its own. If the effective resonance frequency of the power transmitter is desired to be lower than the natural resonance frequency, then switch S1 is closed for a short period of time just after the voltage across $C_p$ passes zero voltage from negative to positive and/or vice versa. This is illustrated in FIG. 13 which first shows the drive signal and the timing signal controlling the switch S, then the current through the inductor 501, and finally the voltage across the capacitor (corresponding to FIG. 7). The drive signal is applied to the resonant circuit with a frequency $f_o$ and duty cycle D of 93 kHz and 10% respectively, i.e. the drive signal has an operating frequency of 93 kHz. In the example, the natural resonance frequency $f_n$ of the resonant tank is 100 kHz. Accordingly, the voltage across the resonance circuit (denoted V(left, right)) should for a free running resonance circuit lag the current $i_p(t)$, meaning that it is in capacitive mode operation. However, in the system of FIG. 12, the switch S1 short circuits the capacitor $C_p$ such that the first harmonic of the voltage V(left, right) and the current $i_p(t)$ are in phase, meaning that the power transmitter operates in resonance. Thus, this resonance is achieved by prohibiting the voltage across capacitor $C_p$ from increasing (or decreasing) just after the event of a zero crossing of the voltage $V(C_p)$ by closing switch S1 with an appropriate duty cycle. This effectively diverts the current from the inductor away from the capacitor $C_p$.

Figure 14:
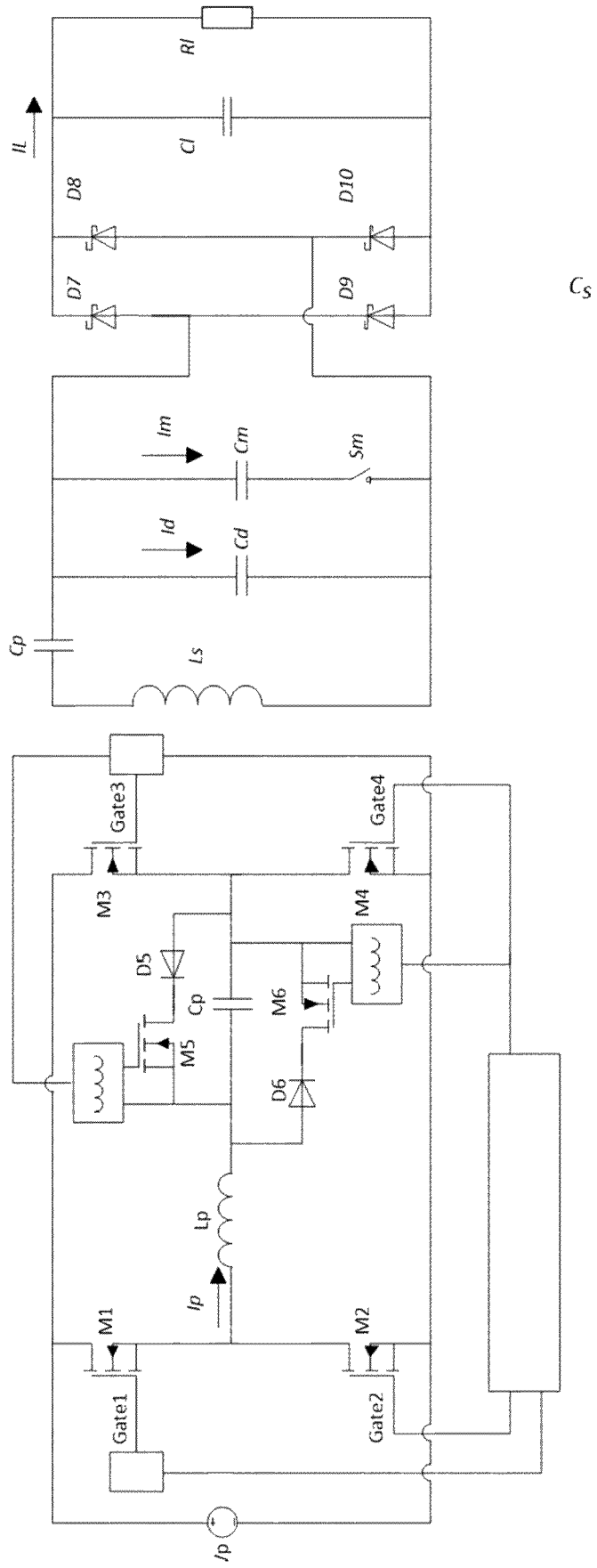
FIG. 14 illustrates an example of elements of a power transmitter and power receiver in accordance with some embodiments of the invention.

An example of an approach which in many embodiments will be more practical than the example of FIG. 12 is provided in FIG. 14. In the example, of FIG. 14, a simplification of the timing of FIG. 12 is achieved which may provide additional flexibility.

In the example of FIG. 14, the switch is replaced by two current diversion paths with one providing a short circuit for current flowing in one direction, and one for current flowing in the other direction. In the example, each current diversion path includes a rectifier (specifically a diode) which ensures that the current can only flow in one direction for that path.

In this example, the positive current through the resonant tank is now shunted by D6/M6 and the negative current is shunted by D5/M5. Diodes D5 and D6 prevent the body diodes of M5 and M6 from conducting. Switch/FET M6 is controlled by exactly the same signal as Switch/FET M4, i.e. in the example the switch signal for controlling the timing of the fractional time interval is exactly the same as the switch signal for one of the switches of the switch bridge. Indeed, at least one of the start and end-times of the fractional time interval is not only synchronized with, but also coincides with a switching of one of the switches of the switching bridge generating the drive signal.

Indeed, when switch M4 is conducting, the voltage $V(C_p)$ is resonating from negative to positive. When this voltage becomes positive, diode D6 starts conducting immediately because switch M6 is already in the on-state. In this way, the current through $i_p(t)$, commutates naturally from capacitor $C_p$ towards D6/M6 without the need for complex timing control. This is further illustrated in FIG. 15.

A similar situation occurs for the second path of M5/D5. Indeed, in this example, the control switch signal for the switch M5 is directly generated to coincide with the switching of M3.

In the example, each of the current diverting paths (D5/M5 and D6/M6) accordingly comprises both a switch and a rectifier. This allows a more flexible timing of the fractional time interval.

Specifically, the use of both a switch and a rectifier allows the power transmitter to align one of the start-time and the end-time of the fractional time intervals to the transitions in the timing signals whereas the other is automatically generated by the rectifier, i.e. it is determined by the rectifier switching between a conductive and non-conductive state.

In the example of FIG. 14, the switch may be switched into a conductive state during the time when the voltage of the capacitor is negative. However, due to the diode D6, the current diversion path of D6/M6 does not conduct any current and thus does not divert any (negative or positive) current from the capacitor 503. Thus, the exact timing of the switching on of the switch M6 is irrelevant, as this does not constitute the startning of a fractional time interval in which current is diverted away.

However, shortly after a zero crossing of the voltage across the capacitor 503, the diode D6 will start to conduct (as soon as the voltage is sufficiently high to provide sufficient forward bias). Thus, when the diode D6 switches from the non-conductive to the conductive state, the current diversion path starts to divert current from the inductor 501 away from the capacitor 503. Thus, the start of the fractional time interval is controlled by the diode switching from the non-conductive to the conductive state and is not dependent on when the switch M6 switches. Thus, the start-time of the fractional time interval may not be aligned to the timing signal.

The current diversion path will continue to divert current until the switch M6 is switched to the open state (as long as there is current flowing from the inductor in the forward direction of diode D6). Thus, the end-time of the fractional time interval is aligned with the transitions of the timing signal, and thus with the transitions of the switch signal for switch M4.

Figure 15:
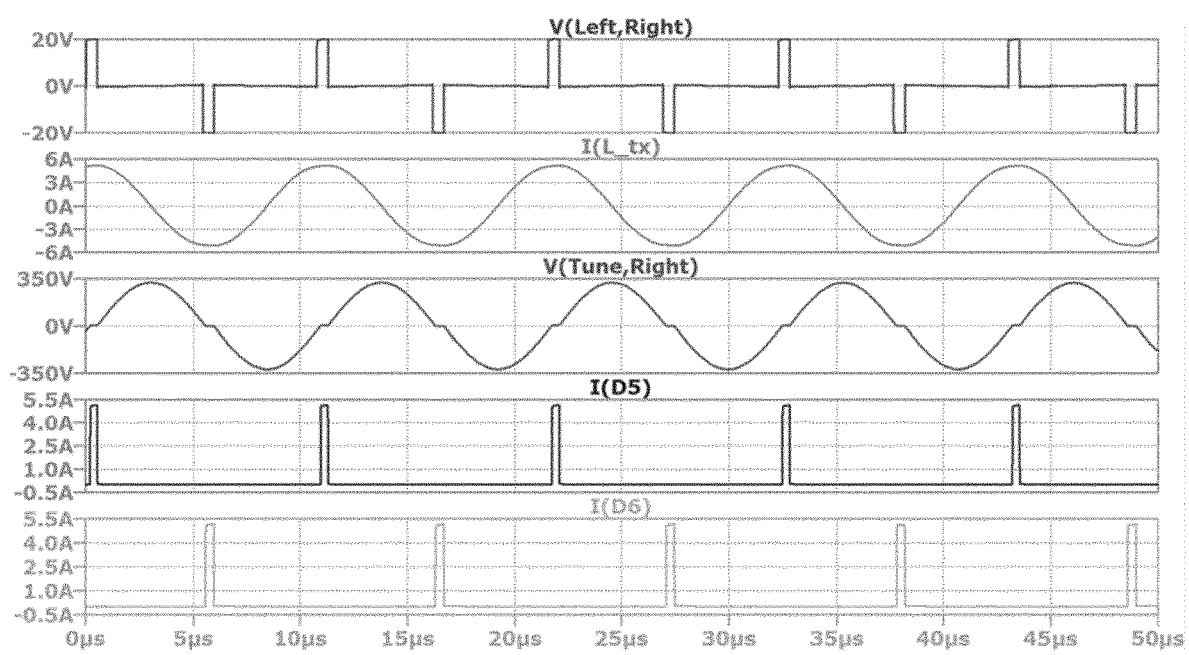
FIG. 15 illustrates examples of signals of a power transmitter in accordance with some embodiments of the invention.

Accordingly, in the example of FIG. 14, and as illustrated by FIG. 15, the power transmitter is arranged to align the start-time of the fractional time intervals to the rectifier (diode D6) switching from a non-conductive to a conductive state whereas the end-time is aligned to the transitions in the timing signal, and thus to the transitions in the switch signal. Indeed, the same switch signal may be used both for the switch of the current diversion path and for the switch of the switch bridge.

It will be appreciated that in other embodiments, the same principles may e.g. be applied to control the end of the fractional time interval in response to a rectifier switching conductive state, including potentially ending the fractional time interval when a rectifier switches from the conductive to the non-conductive state. Such implementations may e.g. be useful when blocking of current to the inductor is employed, e.g. instead of diverting current from the capacitor.

The approach has a number of particular advantages. Indeed, it allows for an automatic synchronization of the start of the fractional time intervals to zero crossings of the capacitor voltage and/or of the inductor current. Thus, it automatically aligns the start of the fractional time interval to times when the components may easily be short circuited or disconnected, thereby allowing a lower complexity embodiment.

Another significant advantage is that it provides additional flexibility in generating the drive signal and the switch signal for the switch bridge. Specifically, as the fractional time intervals are only synchronized to one edge of the switch signals, the other can (within reason) be freely varied. This specifically allows the duty cycle to be varied and thus allows the driver to dynamically vary the power level of the generated power transfer signal without changing e.g. the operating frequency or the amplitude level of the signal.

Indeed, the approach allows for a much simplified generation of the drive signal. Specifically, instead of switching on the corresponding switches of the switch bridge (M1/M4 and M2/M3 respectively) only during the relatively short time interval in which drive signal is active (i.e. as in the first curve of FIG. 15), all of the switches can be operated by substantially square wave signals with a duty cycle of 50%. The duty cycle of the drive signal may then be generated by the relative phase difference between these drive signals. However, as only one of the edges controls the timing of the fractional time intervals, this does not affect the fractional time interval.

Furthermore, the approach still ensures that the first power receiver 105 and the operating frequency are inherently locked together with the same value. Specifically, this results from the fact that the oscillations of the resonance circuit 201 are effectively restarted for every cycle of the drive signal.

It should be noted that in the example of FIG. 14, the voltage levels in the system typically requires that the switches controlling the fractional time interval (i.e. switch M5 and M6) are driven through high voltage level shifters, which is typically implemented using two extra pulse transformers.

Figure 16:
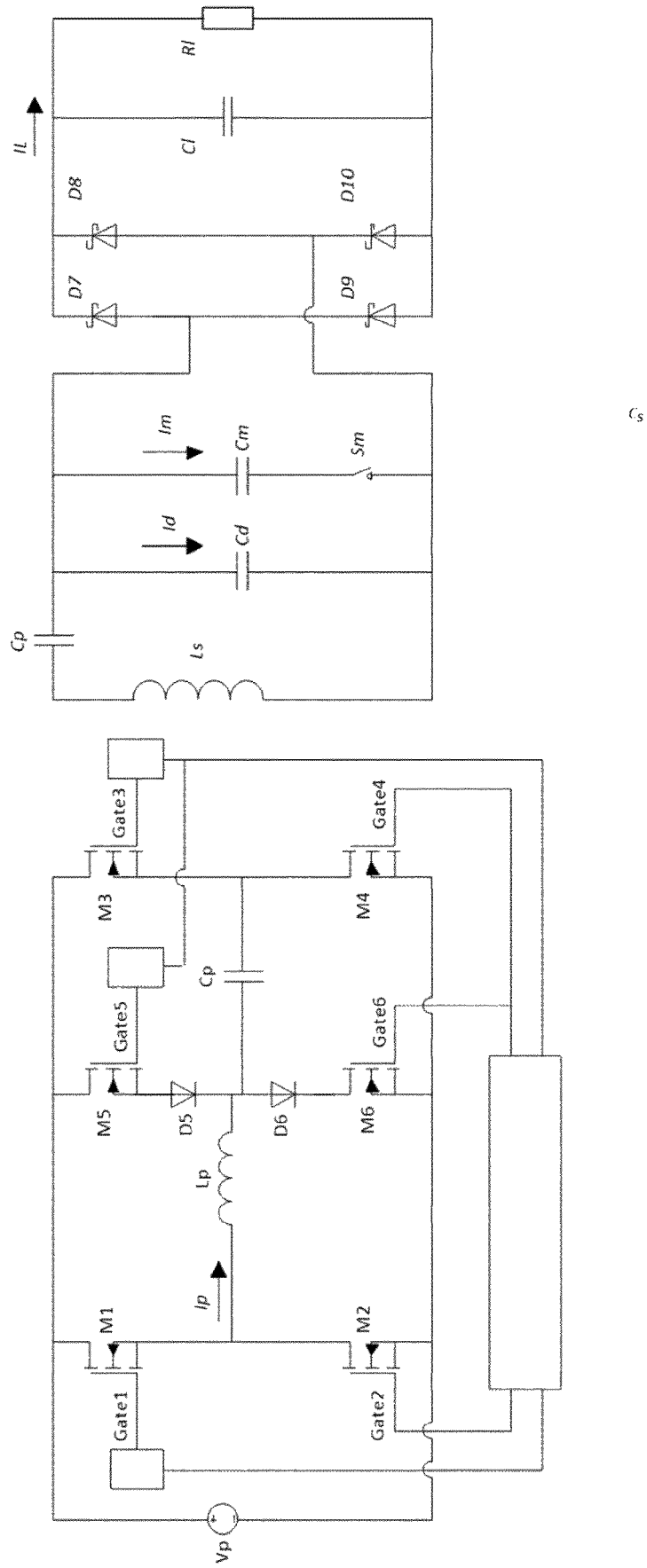
FIG. 16 illustrates an example of elements of a power transmitter and power receiver in accordance with some embodiments of the invention.

However, this may be partly avoided in the system of FIG. 16 (specifically the high voltage level shifter can be avoided for switch M6). In this example, two current diversion paths are coupled between the junction point of the inductor 501 and the capacitor 503 and the power rails for the power supply to the switching bridge.

The operation of the system of FIG. 16 is similar to the example of FIG. 14 and simply provides a different path back to the power supply for the current being diverted. However, an important difference is that switches M5 and M6 are referenced to respectively the voltage rail and ground for the inverter, i.e. to fixed voltages. This may substantially facilitate driving of the switches, e.g. when these are implemented as MOSFETs. In the example, switch M6 can be implemented by a MOSFET being driven directly by the same switch signal as M4. However, a MOSFET implementing M5 would still require a pulse transformer as the voltage of the source of this MOSFET will have negative voltage values.

Figure 17:
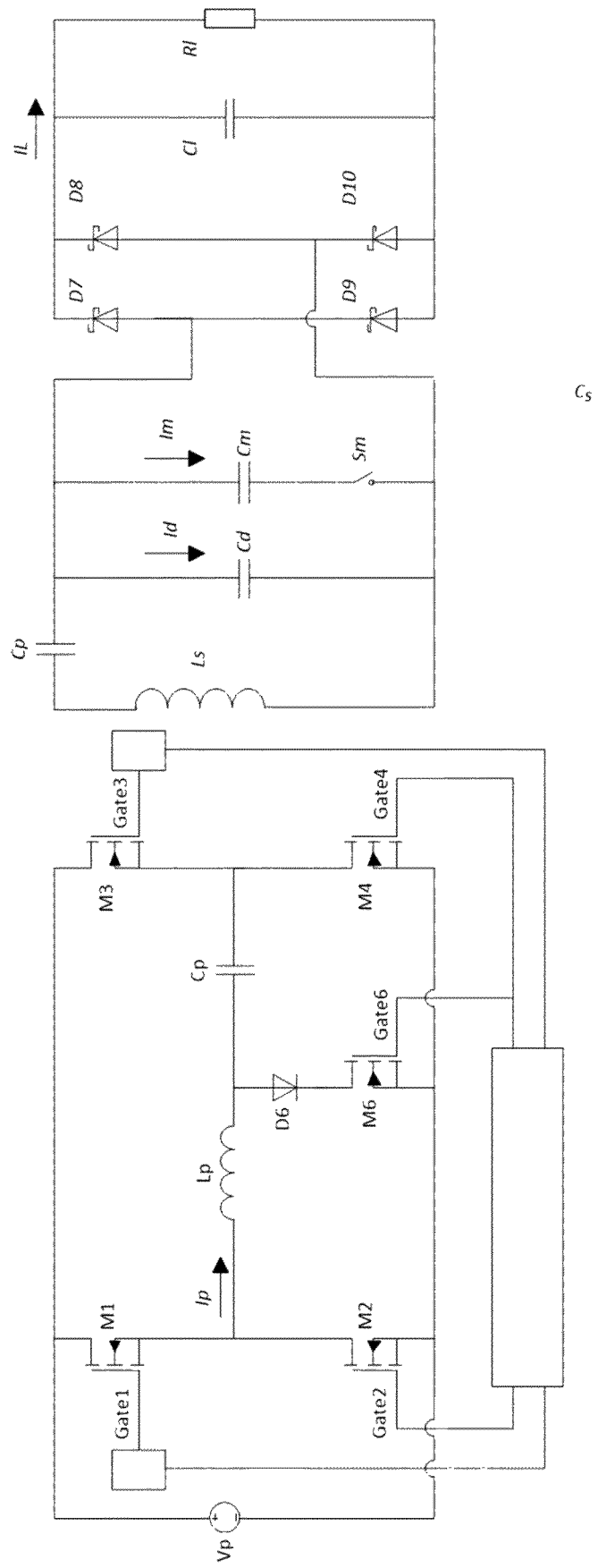
FIG. 17 illustrates an example of elements of a power transmitter in accordance with some embodiments of the invention and power receiver.

FIG. 17 illustrates a modification of the system of FIG. 16. In this example, the current diversion path to the voltage rail, i.e. the current diversion path comprising D5/M5 have been completely removed. Although this system introduces fractional time intervals only for half of the zero crossings (i.e. only one zero crossing per cycle), it has been found to provide an effective adjustment of the effective resonance frequency.

Thus, in the system of FIG. 17, a current diversion path comprises a switch and rectifier coupled in a series configuration and with one end of the current diversion path being coupled to the junction point between the inductor and capacitor and the other end of the current diversion path being coupled to the ground supply rail for the switching bridge. In the system, and rectifier aligns the start-times of the fractional time intervals to the time when the rectifier switches from a non-conductive to a conductive state, whereas the end-times of the fractional time interval are aligned to the switching of switch M4 of the switching bridge.

The approach allows for a very low complexity approach for adapting the resonance frequency of a power transmitter such that it matches the drive signal. The approach can specifically provide an automatic system wherein the frequency of the drive signal is always the same as the resonance frequency of the transmitter resonance circuit, and vice versa.

Figure 18:
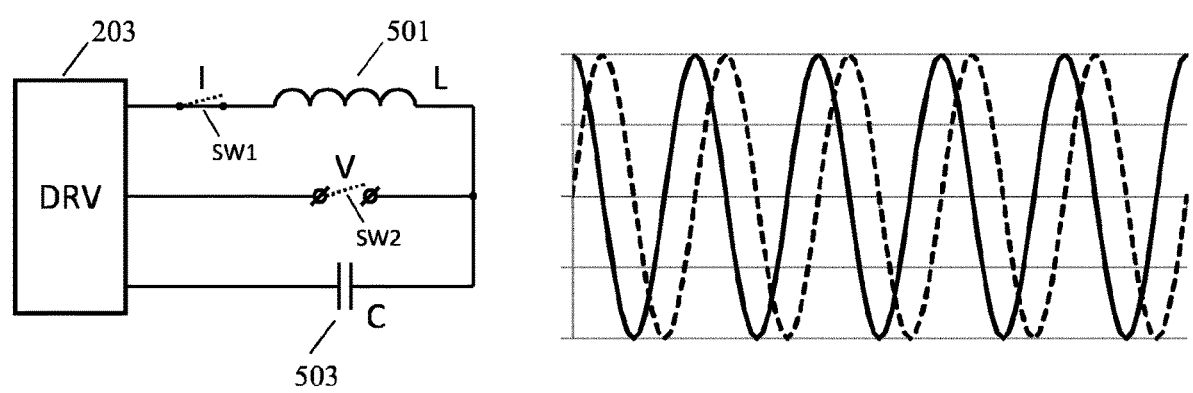
FIG. 18 illustrates an example of elements of, and signals in, a power transmitter in accordance with some embodiments of the invention.

To illustrate the locking of the operating frequency and the transmitter resonance frequency, the system of FIG. 18 may be considered. The example illustrates the driver 203 driving the resonant circuit comprising the inductor 501 (L) and the capacitor 503 (C). If the driver applies a step voltage to the resonant circuit, it starts to oscillate at the well-known resonance frequency $f=1/2\pi\sqrt{LC}$. These oscillations are visible in the current I(drawn line) running through the system, and the voltage V (dashed line) at the junction between the inductor 501 and the capacitor 503. In the presence of damping, the oscillations die out after some time, leading to a steady state in which the capacitor 503 is charged to the step voltage of the driver 203. In practice, the resonant circuit has a high Q factor, i.e. low damping, which means that the oscillations continue for many periods of the resonant frequency.

If the driver 203 applies a signal at a frequency that is equal to the resonance frequency, the oscillations can be sustained indefinitely, even in the presence of damping. In this case, the very high currents can run through the circuit. However, if the driver 203 applies a signal at a frequency that is different from the resonance frequency, the system will not "swing" very well, resulting in much lower current running through the circuit. In fact, in the latter case, the current and voltage signals in the circuit will contain two frequencies, namely the driving frequency and the resonance frequency, where the resonance frequency will be more pronounced with a higher Q factor of the resonant tank circuit. The two frequencies in the current and voltage signals lead to a beat frequency on their amplitude—this is sometimes also (incorrectly) referred to as intermodulation between the two frequencies. In a wireless power transfer system, which relies on amplitude modulation—as achieved through load modulation on the power receiving side of the system—this can make reliable communications difficult, if not impossible. It is therefore advantageous, if not essential in certain cases, to operate the system at a frequency that is equal to the resonance frequency.

Figure 19:
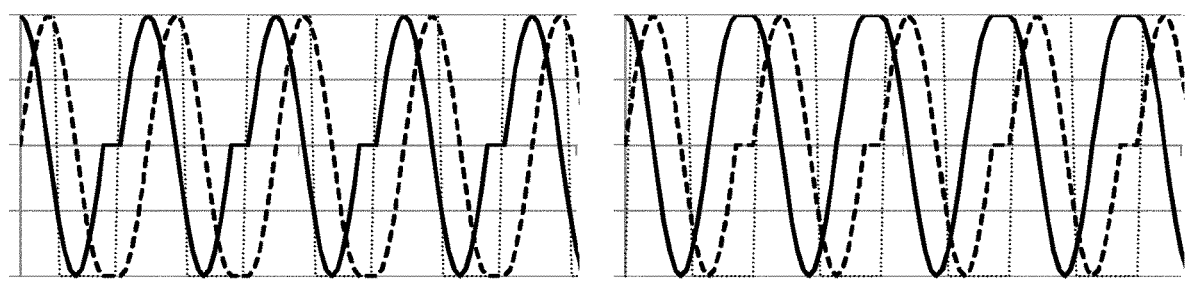
FIG. 19 illustrates examples of signals of a power transmitter in accordance with some embodiments of the invention.

By closing either switch SW1 or SW2 after the completion of a cycle of the oscillations at the resonance frequency, further oscillations at that frequency will be inhibited. In other words, the state of change of the current and voltage signals in the circuit will be slowed down—to zero in this example. Opening the switch again at the start of the next cycle of the driving signal restarts the oscillation at the resonance frequency, as if the driving signal was applied for the first time. This means that the phases of the current signal or voltage signal are reset to match the phase of the driving signal. In other words, the frequency of the cycles in the circuit becomes effectively equal to the driving frequency—but they no longer have a sinusoidal shape. In FIG. 19, the left-hand side shows the resulting waveforms for closing SW1 at a negative-to-positive zero crossing of the current, and the right-hand side figure shows the resulting waveform for closing SW2 at a negative-to-positive zero crossing of the voltage. The drawn waveforms represent the current; the dashed waveforms represent the voltage; and the dotted lines represents the driving signal—in this case a square wave.

It should be noted that depending on the difference between the driving frequency and the resonance frequency, the system may also work to effectively suppress the beats in the current and voltage signals by operating the switch(es) once every few cycles, as opposed to once every cycle. For example, if the driving frequency approaches the resonance frequency, the frequency of the beats increases and the resulting changes in the amplitude take multiple cycles to build up. Resetting the phases every few cycles is in that case sufficient to keep the sensitivity for load-modulation based communications on a sufficient level, while reducing potential losses in the system, which may arise from operating the switch(es).

Synchronizing the operation of the switches can be achieved in many ways such as e.g. described previously for the various different embodiments. Opening the switch is most easily synchronized with an edge—e.g. a rising edge—of a square wave or pulse wave driving signal. For closing the switch, a measurement system can be added to the tank circuit, which triggers on a negative-to-positive zero crossing of the current or voltage signal. Someone skilled in the art will be able to design many kinds of circuits that perform this functionality.

In the case of a wireless power system that comprises a single driver driving multiple tank circuits in parallel, which is an advantageous implementation to achieve greater (lateral) positioning tolerance of the power receiver, it is difficult—if not impossible—to operate the system at the resonance frequency. The reason is that due to natural spread in inductance and capacitance values of the components that are used to implement the wireless power system, each resonant tank circuit typically has a different resonance frequency. By limiting the Q factor of each resonant tank circuit, the current and voltage signal component at the resonance frequency can be kept small relative to the signal component at the drive frequency. This keeps the beats on the amplitude in check, such that communications based on amplitude modulation remain possible. However, a disadvantage of this approach is that a low Q factor requires a relatively high coupling in order to keep the efficiency of the power transfer up to the mark. In other words, the low Q factor does not permit a large distance between the power transmitting and receiving parts of the system.

By inhibiting the free-running oscillations as described above, the beats between the various frequencies in the system—the driving frequency as well as the different resonance frequencies of the multiple resonant tank circuits—can be kept in check, enabling communications by means of amplitude modulation. In other words, it becomes possible to realize a high-Q multi-coil or array-based power transmitter that is able to demodulate amplitude communications from a power receiver that is positioned at a much larger distance.

The previous examples have illustrated specific implementations or embodiments, but it will be appreciated that the approach is not limited to these specific examples as indeed is indicated in the following more general indications.

In some embodiments, the driver comprises a switching bridge for generating the drive signal; and wherein the driver is arranged to synchronize at least one of the start-times and the end-times the fractional time intervals to transitions of a switch signal for a switch of the switching bridge.

This may provide improved performance in many scenarios, and may in particular allow a very efficient and practical implementation. A low complexity but accurate control can be achieved in many embodiments.

In some embodiments, the power transmitter is arranged to determine at least one of the start-time and the end-time for the fractional time intervals to have a fixed time offset to a switch time instant for a switch circuit generating the drive signal.

Specifically, transitions may be generated to have a first a fixed time offset to a switch time instant for a switch circuit (such as a switching bridge) generating the drive signal, and the frequency modification circuit may set the start and/or end-time of the time interval to have a second fixed time offset to the transitions.

The fixed offsets are applied in each of the at least a plurality of cycles of the drive signal.

In some embodiments, the frequency modification circuit comprises a switch and rectifier and the frequency modification circuit is arranged to align one of the start-time and the end-time to the transitions and to align the other of the start-time and the end-time to the rectifier switching between a non-conductive and a conductive state.

This may provide a particularly low complexity and effective control. In particular, it may in many scenarios allow automated adaptation to the appropriate times for slowing the state changes, such as specifically to appropriate zero crossings.

The alignment of the start and end-times in response to different parameters may provide additional flexibility, and in particular may allow more flexibility of controlling parameters of the drive signal, such as specifically the duty cycle.

In some embodiments, the frequency modification circuit may be arranged to slow the state change for the capacitive impedance by diverting current from the inductive impedance away from the capacitive impedance during the fractional time intervals.

This may provide a particularly effective performance while allowing facilitated and typically low complexity implementation.

In some embodiments, the frequency modification circuit comprises a current diversion path arranged to divert current from the inductive resonance away from the capacitive impedance, the current diversion path comprising a switch for connecting and disconnecting the current diversion path; and the frequency modification circuit being arranged to align switching of the switch to the timing signal.

This may provide a particularly effective performance while allowing facilitated and typically low complexity implementation.

In some embodiments, the frequency modification circuit comprises a switch and rectifier coupled in a series configuration and the frequency modification circuit is arranged to align one of the start-time and the end-time to the transitions and to synchronize the other of the start-time and the end-time to the rectifier switching between a non-conductive and a conductive state.

This may provide a particularly low complexity and effective control. In particular, it may in many scenarios allow automated adaptation to the appropriate times for slowing the state changes, such as specifically to appropriate zero crossings.

The alignment of the start and end-times in response to different parameters provide additional flexibility and in particular may allow more flexibility of controlling parameters of the drive signal, such as specifically the duty cycle.

In many embodiments, the start-time of the fractional time intervals may be aligned to the rectifier switching from a non-conductive to a conductive state, and the end-times are controlled by the timing signal.

In some embodiments, a first end of the current diversion path is coupled to a junction point between the inductive impedance and the capacitive impedance.

This may provide a particularly advantageous implementation which allows effective yet facilitated operation. In many embodiments, the approach may reduce the complexity of the frequency modification circuit, such as specifically the number of dedicated components required.

In some embodiments, a second end of the current diversion path is coupled to a voltage supply rail.

This may provide a particularly advantageous implementation which allows effective yet facilitated operation. In many embodiments, the approach may reduce the complexity of the frequency modification circuit, such as specifically the number of dedicated components required. In many embodiments, it may facilitate the driving of the switch for connecting and disconnecting the current diversion path.

In some embodiments, the driver comprises a switching bridge generating the drive signal; and the driver is arranged to synchronize the transitions of the timing signal to coincide with transitions of a switch signal for a switch of the switching bridge.

This may provide improved performance and/or simplified implementation. The synchronization may specifically time align the transitions of the timing signal to those of the switch signal, say e.g. within $\frac{1}{50}^{th}$ of period time for the drive signal.

In some embodiments, the current diversion path comprises a switch and rectifier coupled in a series configuration, a first end of the current diversion path is coupled to a junction point between the inductive impedance and the capacitive impedance and a second end of the current diversion path is coupled to a ground supply rail for the switching bridge, and the power transmitter is arranged to align start-times of the fractional time interval to a time of the rectifier switching from a non-conductive to a conductive state and to align end-times of the fractional time interval to a switching of a switch of the switching bridge.

This may provide particularly advantageous performance and/or implementation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for inductively transferring power to a power receiver, the power transmitter comprising:
   a resonance circuit comprising a capacitive impedance and an inductive impedance,
      wherein the inductive impedance comprises a transmitter coil,
      wherein the transmitter coil is configured to generate a power transfer signal,
      wherein the power transfer signal is configured to wirelessly transfer power to the power receiver;
   a sampler, wherein the sampler is configured to generate samples by sampling at sample times at least one of a current through the transmitter coil and a voltage over the transmitter coil;
   a message receiver,
      wherein the message receiver is configured to receive messages load modulated onto the power transfer signal by the power receiver,
      wherein the message receiver is configured to detect the modulation in response to the samples;
   a driver, wherein the driver is configured to generate a drive signal for the resonance circuit;
   a resonance modification circuit,
      wherein the resonance modification circuit is configured to reduce the resonance frequency of the resonance circuit by slowing a state change for at least one of the capacitive impedance and the inductive impedance in a fractional time interval of each of at least a plurality of cycles of the drive signal,
      wherein the state change is a change of at least one of a voltage of the capacitive impedance and a current of the inductive impedance,
      wherein the resonance modification circuit is configured to begin slowing the state change at a start-time of the fractional time interval and to stop slowing the state change at an end-time of the fractional time interval; and
   a sample time controller, wherein the sample time controller is configured to control the sample times in response to at least one of the start-times and the end-times of the fractional time intervals.

2. The power transmitter of claim 1, wherein the sample time controller is configured to control the sample times to be within the fractional time intervals.

3. The power transmitter of claim 1, wherein the sample time controller is configured to control the sample times in response to the end-times of the fractional time intervals.

4. The power transmitter of claim 1, wherein the sample time controller is configured to control the sample times in response to the start-times of the fractional time intervals.

5. The power transmitter of claim 1, wherein the sample time controller is configured to control the sample times to occur in a time interval from one half cycle time of the drive signal before the start-times to the end-times.

6. The power transmitter of claim 1, wherein the sample time controller is configured to determine the sample times to precede the end-times by a time offset.

7. The power transmitter of claim 6, wherein the time offset is no less than 20 nanoseconds and no more than 5 microseconds.

8. The power transmitter of claim 1, wherein the sample time controller is configured to determine the sample times in response to both the start-times and the end-times.

9. The power transmitter of claim 1,
   wherein the start-times of the fractional time intervals are determined by zero crossings of at least one of the voltage over the inductor and a current of a capacitor of the capacitive impedance,
   wherein the sample time controller is configured to detect the start-times in response to a detection of zero crossings of the at least one of the voltage over the inductor and the current of the capacitor.

10. The power transmitter of claim 1,
    wherein the end-times of the fractional time intervals are aligned with switch transitions of at least one switch of a switch bridge of the driver,
    wherein the sample time controller is configured to determine the end-times in response to a switch signal for the switch bridge.

11. The power transmitter of claim 1, wherein the resonance modification circuit is configured to substantially stop the state change during the fractional time intervals.

12. The power transmitter of claim 1,
    wherein the resonance modification circuit is configured to short-circuit a capacitor of the capacitive impedance during the fractional time intervals
    wherein and the message receiver is configured to demodulate load modulated messages in response to samples of the inductor current during the fractional time intervals.

13. The power transmitter of claim 1 further comprising:
    a timer, wherein the timer configured to generate a timing signal having transitions corresponding to at least one of the start-times and the end-times of the fractional time intervals,
    wherein the sample time controller is configured to control the sample times in response to the transitions of the timing signal.

14. A wireless power transfer system comprising a power transmitter for inductively transferring power to a power receiver, the power transmitter comprising:

a resonance circuit comprising a capacitive impedance and an inductive impedance,
  wherein the inductive impedance comprises a transmitter coil,
  wherein the transmitter coil is configured to generate a power transfer signal,
  wherein the power transfer signal is configures to wirelessly transfer transferring power to the power receiver;
a sampler, wherein the sampler is configured to generate samples by sampling at sample times at least one of a current through the transmitter coil and a voltage over the transmitter coil;
a message receiver,
  wherein the message receiver is configured to receive messages load modulated onto the power transfer signal by the power receiver,
  wherein the message receiver is configured to detect the modulation in response to the samples;
a driver, wherein the driver is configured to generate a drive signal for the resonance circuit;
a resonance modification circuit,
  wherein the resonance modification circuit is configured to reduce the resonance frequency of the resonance circuit by slowing a state change for at least one of the capacitive impedance and the inductive impedance in a fractional time interval of each of at least a plurality of cycles of the drive signal,
  wherein the state change is a change of at least one of a voltage of the capacitive impedance and a current of the inductive impedance,
  wherein the resonance modification circuit is configured to begin slowing the state change at a start-time of the fractional time interval and to stop slowing the state change at an end-time of the fractional time interval; and
a sample time controller, wherein the sample time controller is configured to control the sample times in response to at least one of the start-times and the end-times of the fractional time intervals.

15. A method of operation for a power transmitter inductively transferring power to a power receiver, the power transmitter comprising a resonance circuit, wherein the resonance circuit comprises a capacitive impedance and an inductive impedance, wherein the inductive impedance comprises a transmitter coil, wherein the transmitter coil is configured to generate a power transfer signal, wherein the power transfer signal is configured to wirelessly transfer power to the power receiver; the method comprising:
  generating samples by sampling at least one of a current through the transmitter coil and a voltage over the transmitter coil at sample times;
  receiving messages load modulated onto the power transfer signal by the power receiver in response to the samples;
  generating a drive signal for the resonance circuit;
  reducing the resonance frequency of the resonance circuit by slowing a state change for at least one of the capacitive impedance and the inductive impedance in a fractional time interval of each of at least a plurality of cycles of the drive signal,
  wherein the state change is a change of at least one of a voltage of the capacitive impedance and a current of the inductive impedance,
  wherein the slowing of the state change is begun at a start-time of the fractional time interval and stopped at an end-time of the fractional time interval; and
  controlling the sample times in response to at least one of the start-times and the end-times of the fractional time intervals.

* * * * *